United States Patent [19]

Kerr

[11] Patent Number: 4,559,848
[45] Date of Patent: Dec. 24, 1985

[54] INCREMENTALLY VARIABLE TRANSMISSION

[76] Inventor: John H. Kerr, P.O. Box 40, R.R. 1, Kingston, Ontario, Canada, K7L 4V1

[21] Appl. No.: 375,742

[22] Filed: May 6, 1982

[30] Foreign Application Priority Data

Apr. 8, 1982 [CA] Canada ................................. 400794

[51] Int. Cl.⁴ ........................ F16H 3/44; F16H 37/00
[52] U.S. Cl. .................................. 74/750 R; 74/740; 74/753
[58] Field of Search ................ 74/760, 761, 793, 794, 74/674, 740, 705, 750 R, 753

[56] References Cited

U.S. PATENT DOCUMENTS

| | | | |
|---|---|---|---|
| 593,652 | 11/1897 | Hardingham | 74/760 |
| 662,306 | 11/1900 | Riker | 74/761 |
| 1,256,371 | 2/1918 | Rowledge | 74/761 |
| 1,256,372 | 2/1918 | Rowledge | 74/761 |
| 1,256,373 | 2/1918 | Rowledge | 74/761 |
| 2,697,367 | 12/1954 | Klinther | 74/761 |
| 2,957,371 | 10/1960 | Wang | 74/674 X |
| 3,494,222 | 2/1970 | Hirota et al. | 74/674 X |

FOREIGN PATENT DOCUMENTS 1019612  3/1950  France ................................ 74/761

Primary Examiner—Leslie A. Braun
Assistant Examiner—Arthur T. Quiray
Attorney, Agent, or Firm—Birch, Stewart, Kolasch & Birch

[57] ABSTRACT

A binary logic incrementally variable transmission is provided herein which can include a sequence of either, biratio stages, of quadriratio stages, or a combination of both. Each biratio stage has one binary selectable means, one reactive, one input, and one output component. Each quadriratio stage has two binary selectable means, two reactive, one input, and one output component. The maximum ratio of the transmission results when the reactive components of the stages are grounded to the casing. When the reactive components of the plurality of stages are coupled to their input and output components in binary logic sequence, an incrementally decreasing variable speed ratio of the input/output members of the transmission will result, that far exceeds the number of stages. The basic stage ratio is defined by the maximum ratio of, and the number of biratio stages in the particularly defined transmission sequence, with the state ratios of the stages being of a particularly defined order. The total number of incremental changes in the ratio of the transmission is also particularly defined. (As used herein, the term "ratio state" is defined as the speed ratio of the input/output component of a stage).

22 Claims, 25 Drawing Figures

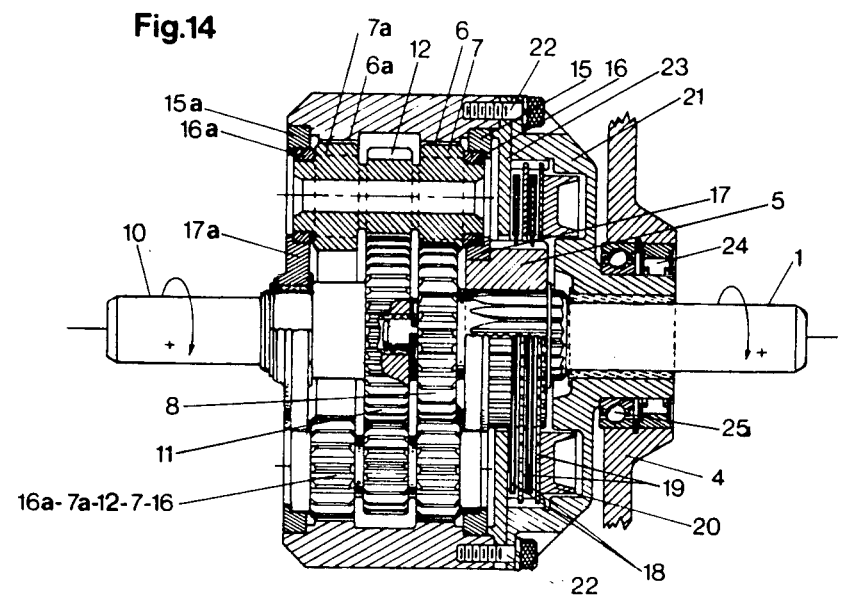
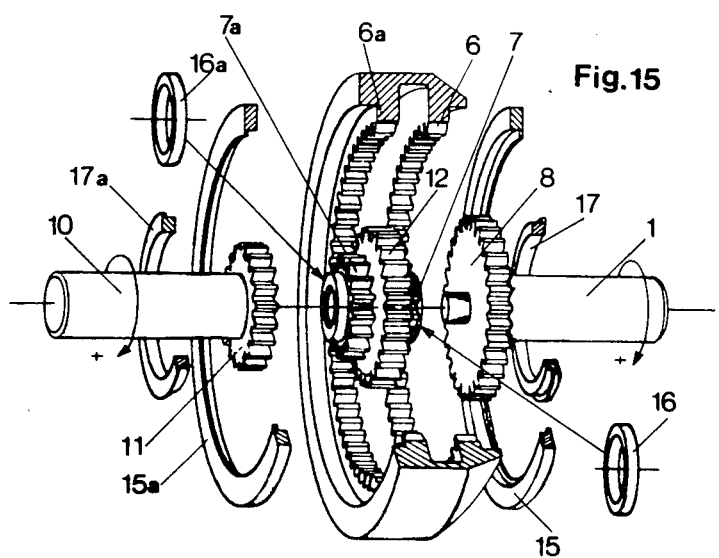

INCREMENTALLY VARIABLE TRANSMISSION

BACKGROUND OF THE INVENTION (i) Field of the Invention

The present invention relates to geared transmissions that have use on road and off-road vehicles, in machinery and other drive applications, where there is a need to alter either the output torque, or output velocity of the prime mover in small incremental steps.

(ii) Description of the Prior Art

Transmissions presently available, such as so-called "automatic" and "manual" automotive transmissions and machinery drives, are generally considered wide ratio transmissions because the change in their gear ratios are in relatively large steps. Although some close ratio geared drives are presently available they are relatively large and expensive. The reason for this is that the number of ratios available is almost directly related to the number of gear sets in the transmission. The following patents reflect this state-of-the-art methodology of effecting ratio changes:

U.S. Pat. No. 338,339, A Variable Speed Power Transmission System, Jan. 17, 1964.

U.K. Pat. No. 958,922, Ratio-Selector Device for Epicyclic Gear Boxes, May. 27, 1964.

U.K. Pat. No. 1,114,186, Epicyclic Gearing, Dec. 21, 1965.

U.K. Pat. No. 1,144,456, Epicyclic Toothed Gearing, July 28, 1966.

U.K. Pat. No. 1,525,593, Planetary Change-Speed Gear, Sept. 20, 1978.

In the above mechanisms the gear elements are either in, or out, of continuum, with each gear set, or combination of gear sets, providing only one of the specific ratios of the transmission.

The following patents reflect the state-of-the-art cageless epicyclic gear trains, and are in some ways related to the structure of the cageless planetary gear trains of this disclosure.

U.K. Pat. No. 1,082,751 Improvements Related to Gears, Sept. 3, 1976.

U.K. Pat. No. 1,248,119 Inprovements In or Relating To Gear trains, Sept. 29, 1971.

U.K. Pat. No. 1266850, Free-floating Planetary Transmission, Mar. 15, 1972.

U.K. Pat. No. 1418284, Planetary Gear, Dec. 17, 1975.

SUMMARY OF THE INVENTION (i) Aims of the Invention

A broad aspect of this invention, is to provide an incrementally variable transmission comprising of a sequence of linked independently operable biratio stages, with each stage having a first-state ratio greater than one and progressively twice the power of the first-state ratio of the previous stage, with all stages having second-state ratios of unity; where state ratio is defined as the speed ratio of the input/output components of the stage.

Another aspect of this invention, is to provide an incrementally variable transmission comprising of a sequence of linked independently operable quadriratio stages, with each stage having a first, second, and third-state ratio greater than one and progressively the fourth power of the equivalent ratio of the previous stage, with all stages having fourth-state ratio of unity; where state ratio is again defined as the speed ratio of the input/output components of the stage.

Yet another aspect of this invention, is to provide an incrementally variable transmission comprising of a combined sequence of linked independently operable biratio and quadriratio stages, with each biratio stage having a first-state ratio greater than one and a second-state ratio of unity, and with each quadriratio stage having a first, second, and third-state ratio greater than one and a fourth-state ratio of unity; where again state ratio is defined as the speed ratio of input/output components of the stage.

(ii) Statement of Invention

By this invention, a binary logic incrementally variable transmission is now provided comprising a sequence of biratio stages with binary selectable means, with each stage having an input, an output and a reactive component; wherefore when the reactive component is grounded to the casing of the transmission a first-state ratio greater than one will result, and when the reactive component is coupled to either the input or output component, a second-state ratio of unity will result; with the ratio states defined as the speed ratio of the input/output components; whereupon, when the biratios of the plurality of stages are selected in binary logic sequence, an incrementally varying speed ratio of the input/output member of the transmission will result; wherefore, the basic stage ratio X of the stages, is defined by the maximum ratio R of, and the number of biratio stages n, as in the sequence 1,2,3, ... n−1,n, in, the transmission.

$$X = R\left[\frac{1}{2^n - 1}\right]$$

wherefore, the first and second-state ratios of the sequences of stages, are of the order of, $$r_{1,2} = [X^{2^{n-1}}]_0^1$$

as with the the first stage, where n=1, the ratio states are X and 1; and, where the total number of incremental ratio changes T, of the transmission is:

$$T = 2^n$$

The invention also provides a binary logic incrementally variable transmission comprising a sequence of quadriratio stages with two binary selectable means; with each stage having an input, an output, and two reactive components; wherefore, when the reactive components are grounded to the casing of the transmission a first-state ratio greater than one will result; and respectively, with only one reactive component grounded to the casing and the second component coupled respectively to the input or output, a second and third-state ratio greater than one will result; and with both the reactive components coupled to the input and output a fourth-state ratio of unity will result; with the ratio states defined as the speed ratio of the input/output components: whereupon, when the quadriratios of the plurality of stages are selected in binary logic sequence, an incrementally varing speed ratio of the input/output members of the transmission will result: wherefore, the basic stage ratio X of the stages, is defined by the maximum ratio R of, and an equivalent number of biratio stages n, as in the sequence 1,2,3, ... n−1,n, in, the transmission;

$$X = R\left[\frac{1}{2^n - 1}\right]$$

wherefore, the first, second, third, and fourth-state ratios of the sequence of stages, are of the order of the separate products of the ratio states of adjacient, equivalent biratio stages n and n+1;

$$r_{1,2,3,4} = [X^{2n-1}]_0^1 \cdot [X^{2n}]_0^1$$

as with the first stage where n=1, the four state ratios are $X^3$, $X^2$, X, and 1, or with the second and third states the converse, $X^3$, X, $X^2$, and 1; and where the total number of incremental ratio changes T, of the transmission is;

$$T = 2^n$$

(iii) Other Features of the Invention

Other features of the present invention will be evident from the following description, with particular reference to the drawings in FIGS. 4 to 8, 10 to 18, and 20 to 23, to be described in detail hereinafter.

(iv) Brief Description of the Invention

The stepping logic that effect the ratio change of the disclosed incrementally variable transmissions is readily described by comparing the binary logic system of a biratio stage transmission with that of a pure binary system of the same order.

| Pure Binary System | | | | Transmission Binary System | | | |
|---|---|---|---|---|---|---|---|
| Binary Element | | | | Transmission Stage | | | |
| 1st | 2nd | 3rd | | 1st | 2nd | 3rd | Trans- |
| Successive Weights | | | Decimal | Successive Weights | | | mission |
| 1 | 2 | 4 | Value | $X^1$ | $X^2$ | $X^4$ | Ratio |
| 1 | 1 | 1 | 7 | 1 | 1 | 1 | $X^7$ |
| 0 | 1 | 1 | 6 | 0 | 1 | 1 | $X^6$ |
| 1 | 0 | 1 | 5 | 1 | 0 | 1 | $X^5$ |
| 0 | 0 | 1 | 4 | 0 | 0 | 1 | $X^4$ |
| 1 | 1 | 0 | 3 | 1 | 1 | 0 | $X^3$ |
| 0 | 1 | 0 | 2 | 0 | 1 | 0 | $X^2$ |
| 1 | 0 | 0 | 1 | 1 | 0 | 0 | $X^1$ |
| 0 | 0 | 0 | 0 | 0 | 0 | 0 | 1 |

The individual biratio-stages of the transmission, like the elements of the pure binary system, have two states as expressed by 0 and 1. However, unlike the pure binary system where the value of the elements are zero or their weighted value, the transmission stages have a value of either $X^n$ or one, where n is the equivalent weighted value of the pure binary model, ie 1,2,4, etc. In an ideal binary logic incrementally variable transmission, the basic stage ratio X is constant.

The novel aspect of this disclosure is the incorporation of this binary model into a practical transmission system. The kinematic novelty of this disclosure is based on the properties of reverted gear train loops and planetary gear trains, either used singularly as biratio stages, or in compounded and integrated gear trains as quadriratio stages. Unlike the state-of-the-art transmissions, the gear-sets of the disclosed transmissions are always in continuum with each set participating fully in the multiplicity of available ratios.

BRIEF DESCRIPTION OF THE DRAWINGS

The following disclosure describes the many aspects of these novel transmissions and refer to the accompanying drawings, in which:

FIGS. 14, and 15, show a biratio stage consisting of a cageless compound planetary gear train similar to FIG. 6, with an overrunning and hydraulically activated disc clutch to effect selection of first and second-state ratios.

Figure 1:
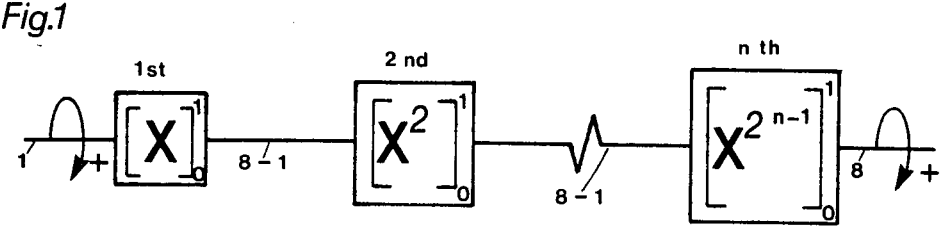
FIG. 1, is a generic schematic flow diagram of a transmission consisting of a binary logic sequence of linked biratio stages.
Figure 2:
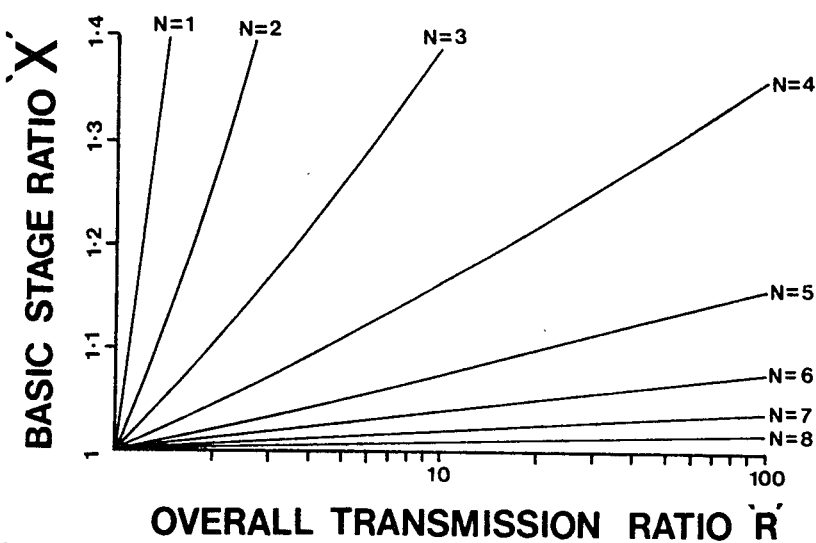
FIG. 2, is a graph showing the relationship of the basic stage ratios X and overall transmission ratio R, as a function of the number of biratio stages N for all binary logic incrementally variable transmissions.

DESCRIPTION OF EMBODIMENT OF THE INVENTION (i) Description of FIGS. 1 and 2

Consider a transmission consisting of a sequence of biratio-stages as shown in FIG. 1, with each stage being independently selectable in either of its biratio states; with first-state ratios of all stages greater than one and progressively twice the power of the previous stage, and with all second-state ratios equil to unity. Selection of the ratio states of the stages can be expressed by the binary term:

$$r_{1,2} = [X^{2n-1}]_0^1 = X^{2n-1} \text{ or } 1 \quad (1)$$

where: $r_{1,2}$ are the ratio states of the n-th stage.

By selecting the first-state ratio of the subsequent biratio stage a binary power of the previous stage, the overall ratio R of the transmission can be traversed in a number of sucessive steps that far exceed the number of biratio stages in the transmission. The following equations express the relationship between the stages of all transmissions. The basic biratio stage ratio X is:

$$X = R \left[ \frac{1}{2^n - 1} \right] \quad (2)$$

where:
R, is the maximum transmission ratio.
n, is the number of biratio stages.
The first-stage ratio $r_1$ of any biratio stage n, is:

$$r_1 = X^{2n-1} \quad (3)$$

The total number of incremental changes T:

$$T = 2^n \quad (4)$$

The relationship of the discrete variables of equation (2), for transmissions with overall ratios R between one and 100, basic stage ratios X between one and 1.4, and with a number of biratio stages n between one and 8, are shown in FIG. 2. For a single stage transmission n=1, the basic stage ratio X is directly proportional to the overall transmission ratio R. As the number of biratio stages increase, X soon becomes a weak function of the overall ratio R.

By assigning the values n=6, and R=9, to equations (2), (3) and (4), the general parameters of a sixty-four ratio binary logic incrementally variable transmission can be derived.

From equation (2):

$$X = 9 \left[ \frac{1}{2^6 - 1} \right] = 1.0355$$

From equation (3):

$r_1 = X^{2^1-1} = X = 1.0355$   $r_4 = X^{2^4-1} = X^8 = 1.3218$
$r_2 = X^{2^2-1} = X^2 = 1.0722$   $r_5 = X^{2^5-1} = X^{16} = 1.7472$
$r_3 = X^{2^3-1} = X^4 = 1.1497$   $r_6 = X^{2^6-1} = X^{32} = 3.0528$

From equation (4):

$$T = 2^6 = 64$$

TABLE 1, shows the sixty-four incremental ratios of the transmission and the sequence in the selection of the first and second-state ratios of the six binary stages, as this ratio changes from 9/1 to 1/1.

| Switching Order of the Binary Stages | | | | | | Incremental Ratio of the Transmission | |
|---|---|---|---|---|---|---|---|
| 1st | 2nd | 3rd | 4th | 5th | 6th | | |
| X^1 | X^2 | X^4 | X^8 | X^16 | X^32 | f(X) | Actual |
| 1 | 1 | 1 | 1 | 1 | 1 | X^63 | 9.0000 |
| 0 | 1 | 1 | 1 | 1 | 1 | X^62 | 8.6915 |
| 1 | 0 | 1 | 1 | 1 | 1 | X^61 | 8.3936 |
| 0 | 0 | 1 | 1 | 1 | 1 | X^60 | 8.1059 |
| 1 | 1 | 0 | 1 | 1 | 1 | X^59 | 7.8281 |
| 0 | 1 | 0 | 1 | 1 | 1 | X^58 | 7.5598 |
| 1 | 0 | 0 | 1 | 1 | 1 | X^57 | 7.3007 |
| 0 | 0 | 0 | 1 | 1 | 1 | X^56 | 7.0504 |
| 1 | 1 | 1 | 0 | 1 | 1 | X^55 | 6.8088 |
| 0 | 1 | 1 | 0 | 1 | 1 | X^54 | 6.5754 |
| 1 | 0 | 1 | 0 | 1 | 1 | X^53 | 6.3500 |
| 0 | 0 | 1 | 0 | 1 | 1 | X^52 | 6.1324 |
| 1 | 1 | 0 | 0 | 1 | 1 | X^51 | 5.9222 |
| 0 | 1 | 0 | 0 | 1 | 1 | X^50 | 5.7192 |
| 1 | 0 | 0 | 0 | 1 | 1 | X^49 | 5.5232 |
| 0 | 0 | 0 | 0 | 1 | 1 | X^48 | 5.3339 |
| 1 | 1 | 1 | 1 | 0 | 1 | X^47 | 5.1510 |
| 0 | 1 | 1 | 1 | 0 | 1 | X^46 | 4.9745 |
| 1 | 0 | 1 | 1 | 0 | 1 | X^45 | 4.8040 |
| 0 | 0 | 1 | 1 | 0 | 1 | X^44 | 4.6393 |
| 1 | 1 | 0 | 1 | 0 | 1 | X^43 | 4.4803 |
| 0 | 1 | 0 | 1 | 0 | 1 | X^42 | 4.3267 |
| 1 | 0 | 0 | 1 | 0 | 1 | X^41 | 4.1784 |
| 0 | 0 | 0 | 1 | 0 | 1 | X^40 | 4.0352 |
| 1 | 1 | 1 | 0 | 0 | 1 | X^39 | 3.8969 |
| 0 | 1 | 1 | 0 | 0 | 1 | X^38 | 3.7634 |
| 1 | 0 | 1 | 0 | 0 | 1 | X^37 | 3.6344 |
| 0 | 0 | 1 | 0 | 0 | 1 | X^36 | 3.5098 |
| 1 | 1 | 0 | 0 | 0 | 1 | X^35 | 3.3895 |
| 0 | 1 | 0 | 0 | 0 | 1 | X^34 | 3.2733 |
| 1 | 0 | 0 | 0 | 0 | 1 | X^33 | 3.1611 |
| 0 | 0 | 0 | 0 | 0 | 1 | X^32 | 3.0528 |
| 1 | 1 | 1 | 1 | 1 | 0 | X^31 | 2.9481 |
| 0 | 1 | 1 | 1 | 1 | 0 | X^30 | 2.8471 |
| 1 | 0 | 1 | 1 | 1 | 0 | X^29 | 2.7495 |
| 0 | 0 | 1 | 1 | 1 | 0 | X^28 | 2.6553 |
| 1 | 1 | 0 | 1 | 1 | 0 | X^27 | 2.5643 |
| 0 | 1 | 0 | 1 | 1 | 0 | X^26 | 2.4764 |
| 1 | 0 | 0 | 1 | 1 | 0 | X^25 | 2.3915 |
| 0 | 0 | 0 | 1 | 1 | 0 | X^24 | 2.3095 |
| 1 | 1 | 1 | 0 | 1 | 0 | X^23 | 2.2304 |
| 0 | 1 | 1 | 0 | 1 | 0 | X^22 | 2.1539 |
| 1 | 0 | 1 | 0 | 1 | 0 | X^21 | 2.0801 |
| 0 | 0 | 1 | 0 | 1 | 0 | X^20 | 2.0088 |
| 1 | 1 | 0 | 0 | 1 | 0 | X^19 | 1.9399 |
| 0 | 1 | 0 | 0 | 1 | 0 | X^18 | 1.8734 |
| 1 | 0 | 0 | 0 | 1 | 0 | X^17 | 1.8092 |
| 0 | 0 | 0 | 0 | 1 | 0 | X^16 | 1.7472 |
| 1 | 1 | 1 | 1 | 0 | 0 | X^15 | 1.6873 |
| 0 | 1 | 1 | 1 | 0 | 0 | X^14 | 1.6295 |
| 1 | 0 | 1 | 1 | 0 | 0 | X^13 | 1.5736 |
| 0 | 0 | 1 | 1 | 0 | 0 | X^12 | 1.5197 |
| 1 | 1 | 0 | 1 | 0 | 0 | X^11 | 1.4676 |
| 0 | 1 | 0 | 1 | 0 | 0 | X^10 | 1.4173 |
| 1 | 0 | 0 | 1 | 0 | 0 | X^9 | 1.3687 |
| 0 | 0 | 0 | 1 | 0 | 0 | X^8 | 1.3218 |
| 1 | 1 | 1 | 0 | 0 | 0 | X^7 | 1.2765 |
| 0 | 1 | 1 | 0 | 0 | 0 | X^6 | 1.2328 |
| 1 | 0 | 1 | 0 | 0 | 0 | X^5 | 1.1905 |
| 0 | 0 | 1 | 0 | 0 | 0 | X^4 | 1.1497 |

-continued

| Switching Order of the Binary Stages | | | | | | Incremental Ratio of the Transmission | |
|---|---|---|---|---|---|---|---|
| 1st | 2nd | 3rd | 4th | 5th | 6th | | |
| X^1 | X^2 | X^4 | X^8 | X^16 | X^32 | f(X) | Actual |
| 1 | 1 | 0 | 0 | 0 | 0 | X^3 | 1.1103 |
| 0 | 1 | 0 | 0 | 0 | 0 | X^2 | 1.0722 |
| 1 | 0 | 0 | 0 | 0 | 0 | X^1 | 1.0355 |
| 0 | 0 | 0 | 0 | 0 | 0 | X^0 | 1.0000 |

The significance of the binary logic incremental variable transmission depicted in Table 1 is best illustrated by a plot of the change in vehicle versus motor speed of an imaginary vehicle installation, as the incremental ratio of the transmission changes from maximum to minimum.

Figure 3:
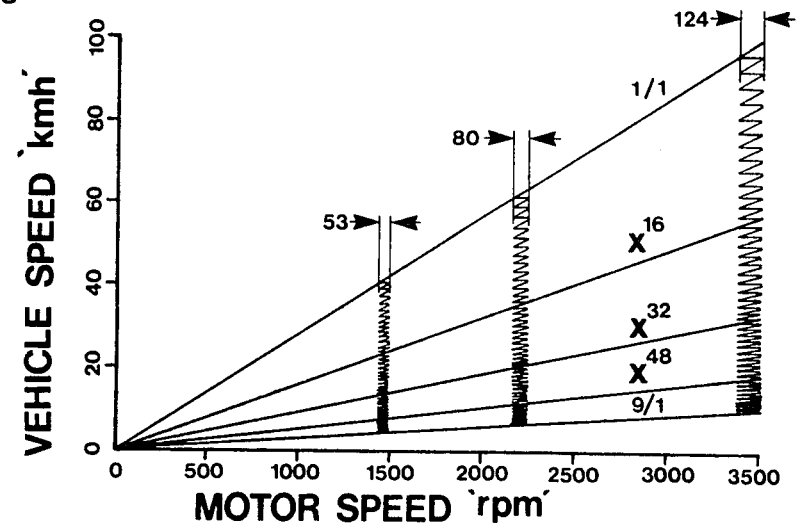
FIG. 3 is a graph showing the change in motor and vehicle speed for three motor operating regimes of a sixty-four increment transmission.

(ii) Description of FIG. 3

FIG. 3, shows such an installation, with the incremental stepping of the transmission decreed by the upper motor speed limits of the three motor speed regimes shown. With these upper limits equal to 3500, 2250, and 1500 rpm, the accompanying drop in motor speeds are 124, 80, and 53 rpm, as the incremental ratio changes from 9/1 to 1. In all three cases the drop in motor speed is, [X−1] times the upper limit of the speed regime. The chart assumes that the vehicle is inertially stable as instantaneous stepping occurs, with the first-state ratios of all six biratio stages as derived from equation (3).

Figure 4:
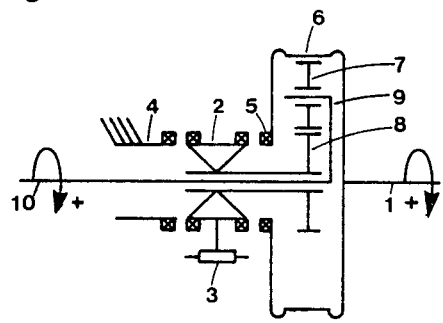
FIGS. 4, 5, 6, 7, and 8, are skeletal diagrams of biratio stages consisting of a simple planetary gear train, a compound planetary gear train, a cageless compound planetary gear train, a reverted gear train loop and a mutated reverted gear train loop (orbital gear train).

The mechanisms shown in FIGS. 4, 5, 6, 7, and 8, are kinematically adaptable to the generic schematic flow diagram of the binary logic incrementally variable transmission of FIG. 1, and are described as follows:

(iii) Description of FIG. 4

FIG. 4, shows a simple planetary gear train, with dog teeth 5 and annulus 6 fixed to input shaft 1, and carrier 9 with planet 7 fixed to output shaft 10. Sliding dog coupler 2 with shift fork 3 is splined to sun pinion 8 so that it may be grounded to dog casing 4 or coupled to the annulus through dog teeth member 5, thereby, providing a first and a second-state ratio. Rotation of input and output are in the same sense. With the maximum ratio of gear elements 6/8=6 the first-state ratio would b 1.1667 thus limiting the use of this mechanism to the fourth, fifth, and sixth biratio stages of the sixty-four ratio transmission previously discussed. The first-state ratio of this mechanism can be further reduced by sizing of the concentric shafts.

Figure 5:
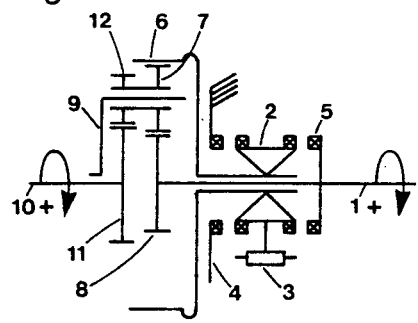

(iv) Description of FIG. 5

FIG. 5, shows a compound planetary train, with carrier 9 and cluster gear 12-7 free members, with sun pinion 8 and dog teeth 5 fixed to input shaft 1. Pinion 11 is fixed to output shaft 10, with sliding dog coupler 2 and shift fork 3 splined to annulus 6 so that it may be grounded to casing 4 or coupled to the input shaft through dog teeth member 5, thereby, providing a first and a second-state ratio. Rotation of input and output are in the same sense with the first-state ratio bound by the closeness of the ratios of gear sets 11/12 and 8/7. Equal ratios would make the first-state ratio unity. Therefore, this mechanism can be used for any of the biratio stages of the sixty-four ratio transmission as discussed. The kinematic equation for the first-state ratio may be stated as follows:

$$r_1 = \frac{1 + \frac{6}{8}}{1 + \frac{6}{7} \times \frac{12}{11}} \quad (5)$$

where: 6, 7, 8, 11, and 12 in the equation, are substituted for the number of teeth on the respective gear elements 6, 7, 8, 11, and 12.

Figure 6:
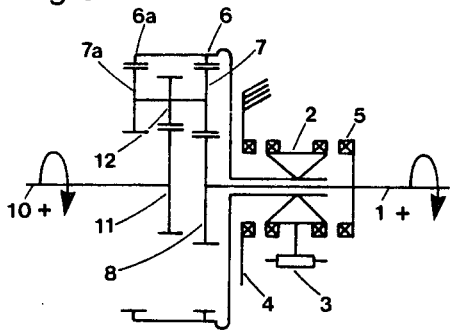

(v) Description of FIG. 6

FIG. 6, shows a cageless planetary gear train, with cluster gear 7a-12-7 such that elements 7a and 7 engage elements 6a and 6 respectively of the double annulus. Sliding dog coupler 2 with shift fork 3 is splined to the annulus so that it may be grounded to dog casing 4, or coupled to the input shaft 1 through dog teeth member 5. Sun pinion 8 is fixed to the input shaft with gear 11 fixed to the output shaft 10. This mechanism is similar to that of FIG. 5 with equation (5) equally valid. FIGS. 14, and 15, detal more clearly the structure of this mechanism.

Figure 7:
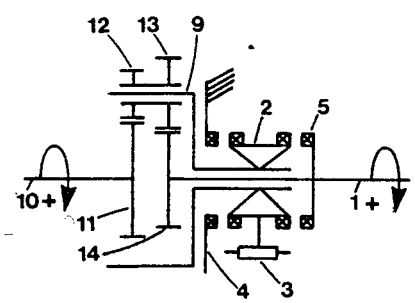

(vi) Description of FIG. 7

FIG. 7, shows a caged reverted gear train loop 11-12-13-14 with gear element 11 fixed to output shaft 10, and gear element 14 together with dog teeth member 5 fixed to input shaft 1. Cage 9 with spool gear elements 12-13 is splined to sliding dog coupler 2 with shift fork 3, so that it may be grounded to dog casing member 4 or coupled to the input shaft by dog teeth member 5, providing a first and a second-state ratio. Rotation of input and output are in the same sense, with the minimum value of the first-state ratio bound by the closeness of the ratio of gear sets 11/12 and 14/13 and therefore, is not restricted to the latter stages of the transmission as previously discussed.

Figure 8:
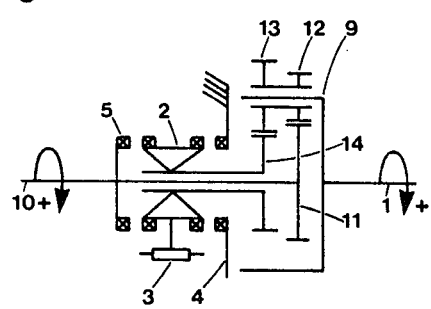

(vii) Description of FIG. 8

FIG. 8, shows a mutated reverted gear train loop 11-12-13-14, with gear 11 together with dog teeth member 5 fixed to output shaft 10, and with cage 9 fixed to input shaft 1. Sliding dog coupler 2 with shift fork 3 is splined to gear element 14 so that it may be grounded to dog casing member 4 or coupled to the output shaft by dog teeth 5, providing a first and a second-state ratio. The loop is said to be mutated in that the first gear element 14 is the reactive member with the input member the cage. With gear 14 grounded and the ratio of gear set 14/13 less then ratio 11/12, input and output rotation will be in the same sense, and in the opposite sense when the ratio of gear set 14/13 is greater than set 11/12. This characteristic is further discussed in conjunction with FIG. 21. The first-state ratio of this mechanism may be defined as follows:

$$r_1 = \frac{1}{1 - \frac{14}{13} \times \frac{12}{11}} \quad (6)$$

where: 11, 12, 13 and 14 in the equation are substituted for the number of teeth in the respective gear elements 11, 12, 13, and 14.

Figure 9:
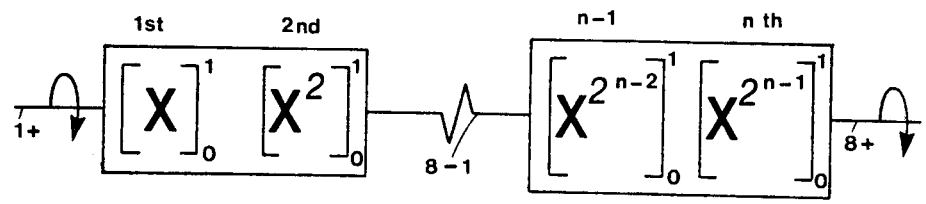
FIG. 9, is a generic schematic flow diagram of a transmission consisting of a binary logic sequence of linked quadriratio stages.

(viii) Description of FIG. 9

The following description now concerns transmissions with sequenced quadriratio stages. FIG. 9 is a generic schematic flow diagram of a binary logic incrementally variable transmission consisting of either integrated or compounded quadriratio stages. Second and third-state ratios of integrated structure are mutually dependent on the ratio of the simple planetary gear train of the mechanism. Whereas, a compounded structure does not have this dependency. Both structures share common members and functionally act the same as two adjacent biratio stages of the generic transmission of FIG. 1. Accordingly, the relationship of the basic biratio stage ratio X and the number of incremental changes T can again be expressed by equations (2) and (4). However, the four ratio states of a quadriratio stage will be the products of the two ratio states of equivalent adjacent biratio stages n and n+1 of the generic transmission of FIG. 1, and can be expressed by the following equation:

$$r_{1,2,3,4} = [X^{2n-1}]_0^1 \cdot [X^{2n}]_0^1 \qquad (7)$$

Figure 10:
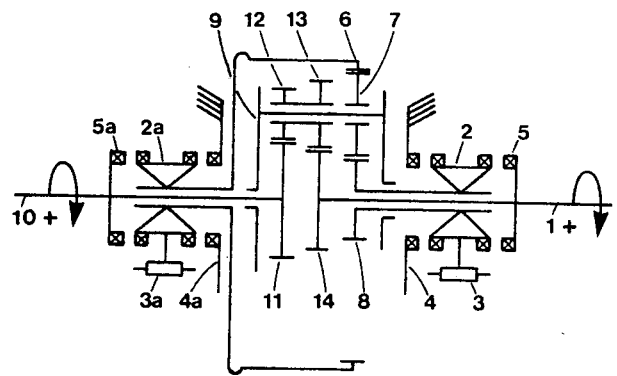
FIGS. 10, and 11, are skeletal diagrams of integrated quadriratio stages consisting of either a caged or cageless combination of a split-reaction reverted gear train loop and a planetary gear train.

Further, FIGS. 2 and 3, together with Table 1 are equally applicable, when the equivalent adjacent number of stages n of a quadriratio stage transmission is 6 and the overall ratio R=9. The mechanisms of FIGS. 10, 11, 12, 12a, 13, and 13a, are kinematically adaptable to the generic schematic flow diagram of FIG. 9, and are described as follows:

(ix) Description of FIG. 10

FIG. 10, shows a caged split-reaction reverted gear train loop 11-12-13-14; with gear cluster elements 12-13 and planet 7 free to rotate on the shaft of the free cage 9. Gear element 14 together with dog teeth member 5 are fixed to the input shaft 1. Gear element 11 together with a second dog teeth member 5a is fixed to the output shaft 10. Sliding dog coupler 2 with shift fork 3, is splined to the sun pinion 8 so that it may be coupled to the input shaft by dog teeth member 5 or grounded to dog casing member 4. A second dog coupler 2a with shift fork 3a, is splined to the annulus 6 so that it may be either coupled to the output shaft by the second dog teeth member 5a or grounded to a second dog casing member 4a. The reactive torque of the reverted gear train loop is transferred to the planet 7 of the simple planetary gear train, and subsequently split between the annulus 6 and the sun pinion 8. The relative magnitude of this split is dependent on the ratio of the number of teeth on these two gear elements. The split reactive torque of the loop may now be grounded or coupled to the input, and grounded or coupled to the output, resulting in a quadriratio mechanism with the two intermediate ratios dependent on the number of teeth on the annulus and sun pinion of the planitary gear train. Kinematic equations for each of the four ratio states of this mechanism may be stated as follows:

CASE I

Sun Pinion To Ground Or Input: Annulus To Ground Or Output

First-state: With both the annulus and the sun pinion grounded, the ratio of input/output is;

$$r_1 = \frac{11}{12} \times \frac{13}{14} \qquad (8)$$

Second-state: With the annulus grounded and the sun pinion coupled to the input shaft, the ratio of input/output is;

$$r_2 = \frac{1 + \frac{6}{8}}{1 + \frac{6}{8} \times \frac{14}{13} \times \frac{12}{11}} \qquad (9)$$

Third-state: With the sun pinion grounded and the annulus coupled to the output shaft, the ratio of input/output is;

$$r_3 = \frac{1 + \frac{8}{6} \times \frac{11}{12} \times \frac{13}{14}}{1 + \frac{8}{6}} \qquad (10)$$

Fourth-state: With the sun pinion coupled to the input shaft and the annulus coupled to the output shaft, $$r_4 = 1$$

where: 6, 8, 11, 12, 13, and 14 in the equations are substituted for the number of teeth on the respective gear elements 6, 8, 11, 12, 13, 14.

The generic schematic flow diagram of FIG. 9, as with the flow diagram of FIG. 1, requires that the sequence have first-state ratios twice the power of the previous stage. This is contemplated in the quadriratio stage mechanisms by the change between the first and second, and between the second and third-state ratios. Therefore, the value of equation (9) must be twice the power of the value of equation (10). Further, since the product of equations (9)×(10) must be equil to the value of equation (8) it follows that:

$$r_2 = r_1^{2/3} \text{ and } r_3 = r_1^{1/3}$$

For any given value of $r_1$, the number of teeth on the gear elements of the loop 11-12-13-14 can be calculated using equation (8). As an example consider the sixty-four increment transmission as defined in the discussion of FIG. 1. The first-state ratio for the first quadriratio stage $x - x^2$ would be $1.0355 \times 1.0722 = 1.1103$ [see the derived values of X, and $X^2$ from equation (3)]. A good approximation of this value would be loop gear elements with the following number of teeth $30/17 \times 17/27 = 1.1111$. These loop gear elements may now be substituted in either equation (9) or (10) and the required number of teeth for the annulus 6 and sun pinion 8 solved for.

In the selection of the sequence of first-stage ratios as contemplated by the change between the first and second, and between the second and third-state ratio of the quadriratio stages of FIG. 9, the elected relationship between $r_2$ and $r_3$ could have been the converse, in that $r_3$ could be twice the power of $r_2$. This election has the effect of inverting equations (9), and (10), with the numerator now expressing the rotation of the output shaft, and the denominator now expressing the rotation of the input shaft. The same effect would result if the sun pinion could be either grounded or coupled to the output, with the annulus either grounded or coupled to the input, opposite to that stated in CASE I. This alternative is disclosed as CASE II, and appears later in the disclosure.

Figure 11:
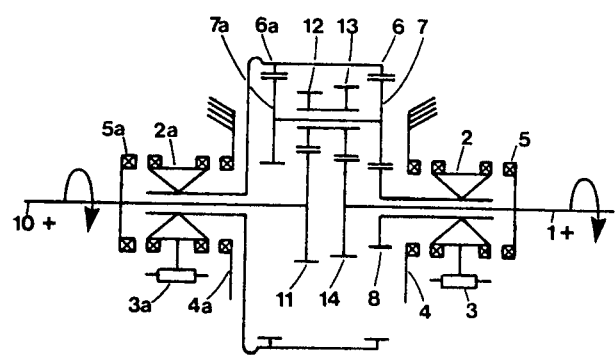

(x) Description of FIG. 11

FIG. 11, shows a cageless split-reaction reverted gear train loop 11-12-13-14, with gear cluster elements 12-13 free to rotate on the joining shaft of the identical planet spool member 7a-7, which mesh respectively with the double annulus 6a-6. Dog teeth member 5 and gear element 14 of the loop are fixed to input shaft 1. Sliding dog coupler 2 with shift fork 3 is splined to sun pinion 8, and free to couple to either grounded dog casing member 4 or to dog teeth member 5 fixed to input shaft 1. The sun pinion 8 meshes with planet 7 of the spool. A second dog teeth member 5a and gear 11 of the loop, are fixed to output shaft 10. A second sliding dog coupler 2a with shift fork 3a is splined to the double annulus 6a-6 and free to couple with either the second grounded dog casing member 4a, or to member 5a fixed to output shaft. A more complete description of a cageless split-reaction reverted gear train loop is given in the discussion of FIG. 17. Kinematic equations and the discussion of this mechanism, is the same as that of FIG. 10.

In the selection of the four state ratios of the quadriratio mechanisms of FIGS. 10 and 11, the sun pinion is either grounded or coupled to the input shaft, with the annulus either grounded or coupled to the output shaft. The sun pinion can also be either grounded or coupled to the output shafts, with the annulus either grounded or coupled to the input shaft. This may be done by interchanging the input and output members of FIGS. 10 and 11. Whereas the first and fourth-state ratios would not be altered, the second and third-state ratios would no longer be expressible by equations (9) and (10). Kinematic equations for the second and third state ratios of this rearrangement, may be expressed as follows, and is the second case as stated above:

CASE II

Annulus to Ground or Input: Sun Pinion to Ground or Output

Second-state: With the annulus grounded, and the sun pinion coupled to the output shaft.

$$r_2 = \frac{1 + \frac{6}{8} \times \frac{11}{12} \times \frac{13}{14}}{1 + \frac{6}{8}} \quad (11)$$

Third-state: With sun pinion grounded, and the annulus coupled to the input shaft.

$$r_3 = \frac{1 + \frac{8}{6}}{1 + \frac{8}{6} \times \frac{14}{13} \times \frac{12}{11}} \quad (12)$$

where: 6,8,11,12,13, and 14 in the equation are substituted for the number of teeth in the respective gear elements 6,8,11,12,13,14.

Since in both the above cases for a given value of $r_1$, either equations (9) or (10), and either equations (11) or (12) can be used to solve for the number of teeth in their respective annulus and sun pinion gear elements 6 and 8, it follows that the values of $r_2$ and $r_3$ are mutually dependent; thus the term integrated quadriratio stage. The algebraic solution for each of the above cases reveal the following:

CASE I Required tooth ratio of;

$$\text{Annulus/Sun pinion} = r_1^{2/3} + r_1^{1/3}$$

CASE II Required tooth ratio of;

$$\text{Annulus/Sun pinion} = \frac{r_1^{2/3} + r_1^{1/3}}{r_1}$$

Figure 12:
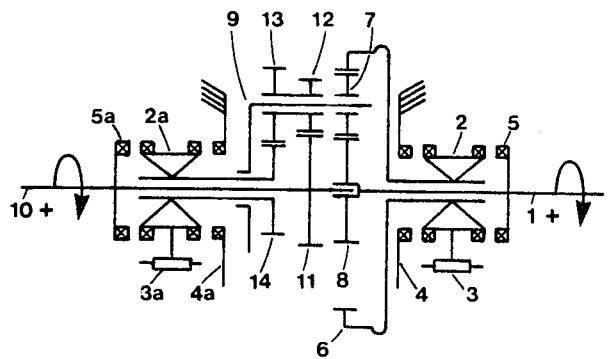
FIGS. 12, and 13, are skeletal diagrams of compounded quadriratio stages consisting of either a caged or cageless combination of a mutated reverted gear train loop and a planetary gear train.

(xi) Description of FIG. 12

FIG. 12, shows a caged compound quadriratio stage consisting of a split-output planetary gear train and a mutated reverted gear train loop that share common free cage 9. Sun pinion 8 and dog teeth 5 are fixed to the input shaft 1. The dog coupler 2 with shift fork 3 are splined to the annulus 6 so that it may be either coupled to the input shaft by dog teeth member 5 or grounded to dog casing member 4. Planet 7 is mounted and free rotate in cage member 9. Mutated reverted gear train loop 11-12-13-14 has cluster gear elements 12-13 mounted and free to rotate in cage member 9 with gear element 11 fixed to the output shaft 10. A second dog coupler 2a and shift fork 3a is splined to gear element 14 so that it may be coupled to either the output shaft by dog teeth member 5a or grounded to dog casing member 4a. Kinematic equations for this mehanism may be expressed as follows:

First-state: With both the annulus and gear element 14 grounded.

$$r_1 = \frac{1 + \frac{6}{8}}{1 - \frac{14}{13} \times \frac{12}{11}} \quad (13)$$

Second-state: With the annulus grounded and gear element 14 coupled to the output shaft.

$$r_2 = \frac{1 + \frac{6}{8}}{1} \quad (14)$$

Third-state: With the annulus coupled to the input shaft and gear element 14 grounded.

$$r_3 = \frac{1}{1 - \frac{14}{13} \times \frac{12}{11}} \quad (15)$$

Fourth-state: With the annulus coupled to the input shaft and gear element 14 coupled to the output shaft, the ratio is unity.

where: 6,8,11,12,13, and 14 in the equations are substituted for the number of teeth on the respective gear elements 6,8,11,12,13,14.

Examination of equations (13) and (15) show that with the ratio of the loop greater than one the first and third-state ratios will be negative, and when less than one positive. Further, the second-state ratio is dependent only on the proportions of the planetary gear train, whereas the third-state ratio is dependent only on the proportions of the reverted gear train loop. Unlike the integrated double stage mechanisms of FIGS. 10 and 11, the loop and train gear elements of this mechanism are clearly independent binary stages similar to FIGS. 4 and 8, that simply share a common cage. Thus the term compounded quadriratio stage. Again, the first and second-state ratios must be positive and have the same relationship as in the discussion of FIG. 10.

Figure 12A:
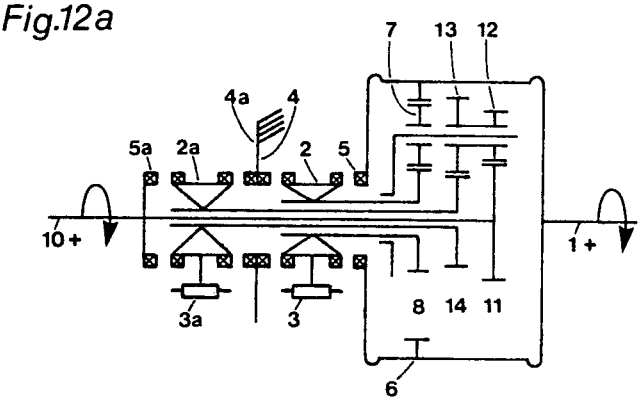
FIGS. 12a, and 13a, are skeletal diagrams similar to FIGS. 12 and 13, except that the input to the mechanisms is the annulus rather than the sun pinion of the planetary gear train.

(xii) Description of FIG. 12a

FIG. 12a, shows a caged split-output planetary gear train with dog coupler 2 and shift fork 3 splined to the sun pinion 8 so that it may be coupled to annulus 6 by dog teeth member 5 or grounded to dog casing member 4. The planet gear element 7 is mounted, together with the cluster gear elements 12-13 of the reverted gear train loop 11-12-13-14, in the common cage 9. Annulus 6 is fixed to the input shaft 1. Gear element 11, together with a second dog teeth member 5a are fixed to output shaft 10. A second dog coupler 2a with shift fork 3a is splined to gear element 14 so that it may be coupled to the output shaft by second dog teeth member 5a or grounded to dog casing member 4a. Equations (13),(14), and (15) may be used to obtain the first, second, and third-state ratios of this mechanism if gear elements 6 and 8 are interchanged.

Figure 13:
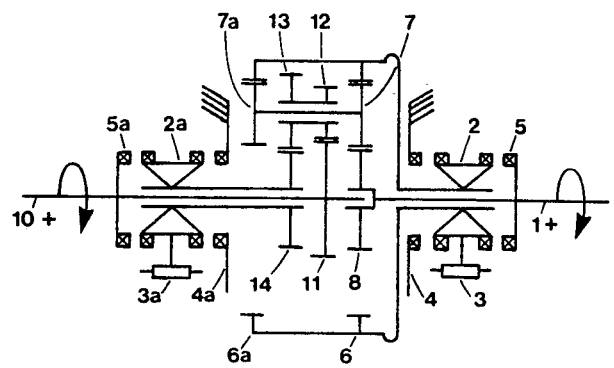

(xiii) Description of FIG. 13

FIG. 13, shows a cageless split-output planetary gear train with dog coupler 2 and shift fork 3 splined to the double annulus 6a-6 so that it may be coupled to either the input shaft 1 by dog teeth member 5, or grounded to dog casing member 4; with the planet spool gear elements 7a-7 meshing with the annulus, and the sun pinion 8 fixed to input shaft and meshing with planet gear element 7. Reverted gear train loop 11-12-13-14 has cluster gear elements 12-13 mounted free to rotate on the shaft of the spool, with gear element 11 fixed to output shaft 10. A second dog coupler 2a and shift fork 3a is splined to gear element 14 so that it may be coupled to either the output shaft by dog teeth member 5a or grounded to dog casing member 4a. The kinemmatic equations and discussion of FIG. 12 applies equally to this mechanism.

Figure 13A:
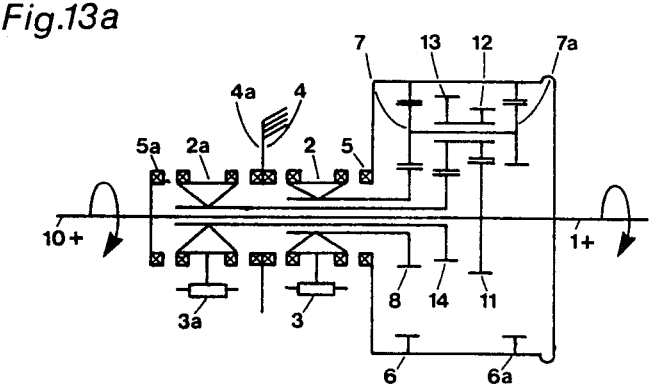

(xiv) Description of FIG. 13a

FIG. 13a, shows a cageless split-output planitary gear train with dog coupler 2 and shift fork 3 splined to the sun pinion 8 so that it may be coupled to double annulus 6a-6 by dog teeth member 5, or grounded to dog casing member 4. Cluster gear elements 12-13 of the reverted gear train loop 11-12-13-14, is mounted free to rotate on the shaft of the gear elements 7a-7 with the double annulus fixed to input shaft 1. Gear element 11 together with a second dog teeth member 5a are fixed to output shaft 10. A second dog coupler 2a with shift fork 3a is splined to gear element 14 so that it may be coupled to the output shaft by dog teeth member 5a or grounded to dog casing member 4a. Again, kinematic equations (13),(14), and (15) may be used to obtain the first, second, and third-state ratios of this mechanism if gear elements 6 and 8 are again interchanged in the formulas.

(xv) Description of FIGS. 14 and 15

FIG. 14, is a half section view of a cageless planetary gear train similar to FIG. 6, that utilizes a disc clutch and overrunning clutch rather than a double dog clutch to activate the first and second-state ratios. To the double annulus 6a-6 is fixed by fastener 22, clutch backing plate 23 and splined housing 21, with bearing 25 and overrunning clutch 24 fitted and assembled in casing 4. Clutch activating piston 20, discs 18, plates 19, and hub 5 are assembled and splined to input shaft 1. Gear element 11 is fixed to output shaft 10 and coaxially mounted with the input shaft. Two cluster gear elements 7a-12-7 are shown, with gear elements 7a and 7 meshing with double annulus 6a-6, and elements 12 and 7 meshing with gear elements 11 and 8. The axes of the spool is radially centered by the affixed rolling elements 16a and 16 with outside diameters equal to the pitch circle diameter of gear elements 11a-11, rolling on outer races 15a and 15 fitted with end thrust flanges and race diameters equal to the pitch circle diameter of elements 6a-6, and with inner races 17a and 17 fitted with thrust flanges and having race diameters equal to the pitch circle diameters of the sun pinion 8, with inner race 17a free to rotate on output shaft 10, and inner race 15 fixed to hub 5. Meshing between gear elements 7a-6a and 7-6 maintain the axis of the spool parallel with the center axis of the mechanism.

With the disc clutch open, and the ratio of gear set 11/12 greater than gear set 8/7 the negative torque on the annulus 6a-6 will be transferred to the grounded casing member 4 through the overrunning clutch 24, with the cluster now free to orbit around the center axis. The first-state ratio will be positive and may be derived from equation (5). With the disc clutch closed the reactive torque is coupled to the input shaft resulting in a second-state ratio of unity.

FIG. 15, is a sectioned exploded view of the biratio stage mechanism of FIG. 14 showing only the gear and rolling elements.

Figure 16:
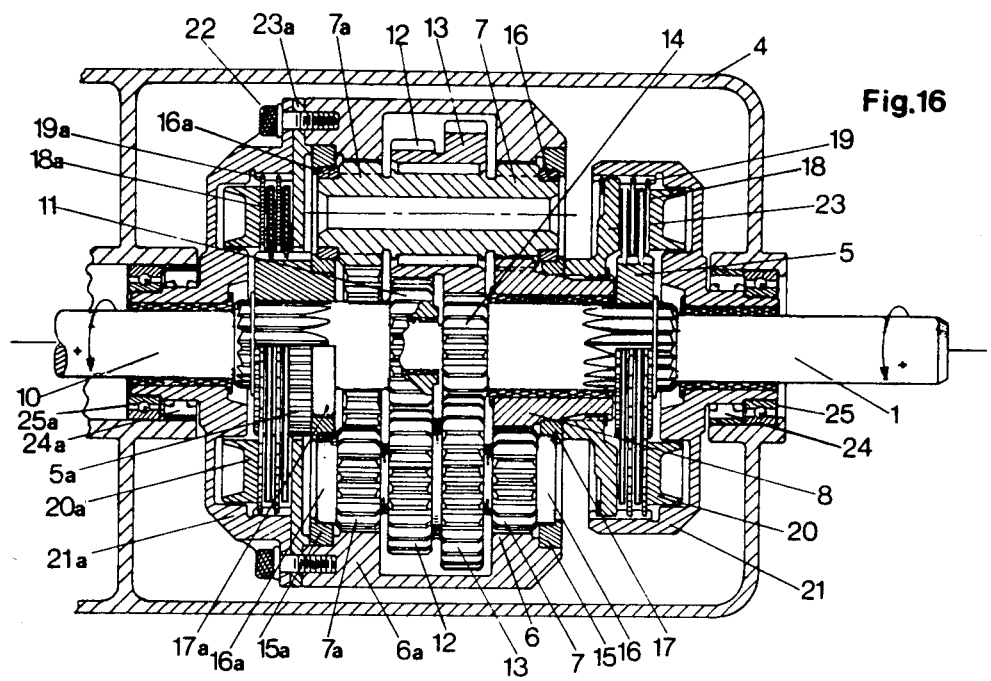
FIGS. 16, and 17, show integated quadriratio stages consisting of cageless split-reaction reverted gear train loops similar to FIG. 11, with overrunning and hydraulic disc clutches to effect selection of the four ratio states.
Figure 17:
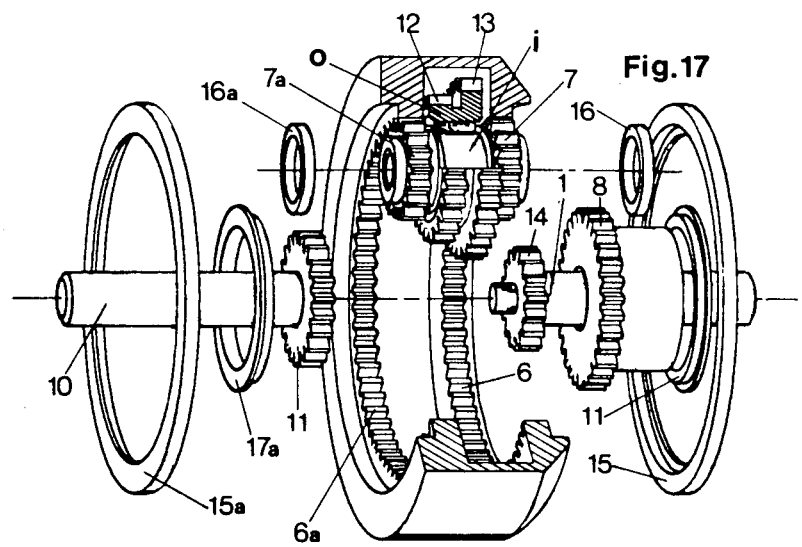

(xvi) Description of FIGS. 16 and 17

FIG. 16, is a half-sectioned view of a cageless split-reaction reverted gear train loop similar to the mechanism of FIG. 11, that utilizes disc and overrunning clutches to effect the selection of the four ratio states of the mechanism. Fastened to the double annulus 6a-6 is clutch backing plate 23a and the splined housing 21a, which is assembled to the casing 4 with bearing 25a and overrunning clutch 24a. Activating piston 20a, discs 18a, and plates 19a are assembled with adapter hub 5a and provide the means of coupling the annulus to output shaft 10. Splined to sun pinion 8 is backing plate 23 and splined housing 21 with activating piston 20, discs 18, and plates 19, and assembled to the casing 4 with bearing 25 and overrunning clutch 24, and provide the means of coupling the sun pinion to the input shaft. Cluster gear 12-13, spool 7a-7, gear elements 11,14, and 13 are arranged as described in FIG. 11. Again, the spool is radially centered as described in the discussion of FIG. 14.

With the disc clutches open and the ratio of the loop $11/12 \times 13/14$ greater than one, the negative reaction on the spool elements 12-13 will be split to the annulus and the sun pinion, which, in turn is transfered to the casing through the overrunning clutches 24a and 24, with only the loop elements 11-12-13-14 rotating, and the mechanism in the first-state ratio. The second-state ratio occurs when clutch piston 20 is activated, coupling the sun pinion to the input shaft. The third-state ratio occurs when clutch piston 20a is activated, coupling the annulus to the output shaft, with the fourth-state occurring when both clutches are activated, and the mechanism becomes a solid coupling with no relative motion between any of the gear elements. However, regardless of the ratio state all gear elements are subject to the continuum torque loads. By interchanging elements 1 and 8, and reversing the gear elements of the loop, the sun pinion can be coupled to the output shaft and the annulus can be coupled to the input shaft, with equations (11) and (12) CASE II, defining the second and third-state ratios of the mechanism.

FIG. 17, is a sectioned exploded view showing the gear and rolling elements of the quadriratio stage mechanism of FIG. 16. Only one spool 7a-7, and one cluster gear element 12-13 is shown. All elements are as identified in the previous discussion with the bearing races of the spool and cluster i and o, added for clarity.

Figure 18:
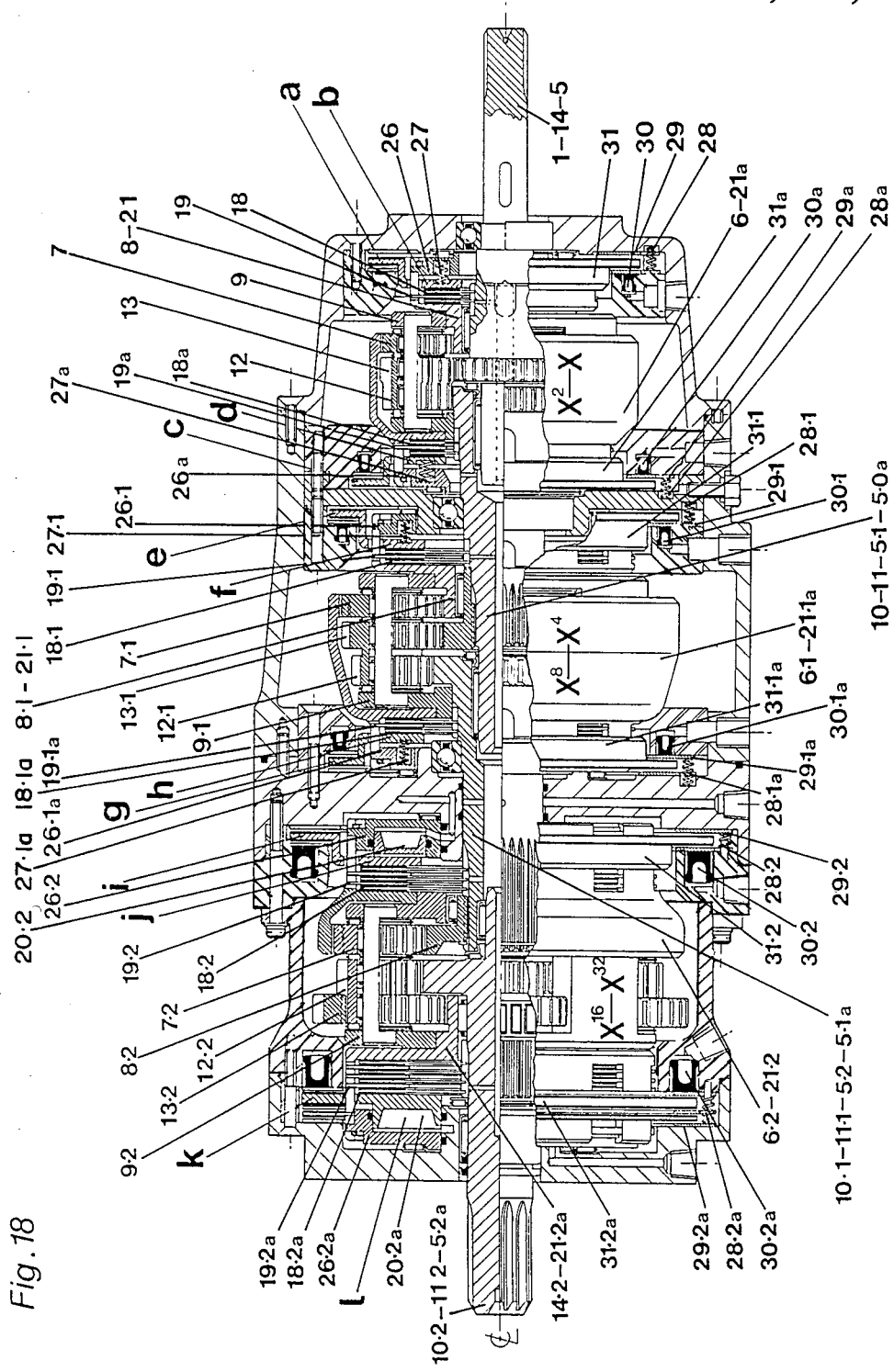
FIG. 18, shows a sixty-four increment transmission consisting of three caged quadriratio stages, with the first and second stages $X^2-X$ and $X^8-X^4$ similar to FIG. 10, CASE I, and incorporating interactive spring and hydraulic disc clutches to effect selection of their four ratio states, and with the third stage $X^32-X^16$ similar to FIG. 12, and incorporating interactive twin hydraulic disc clutches to effect selection of its four ratio states.

(xvii) Description of FIG. 18

FIG. 18, is a sectioned assembly drawing of a binary logic incrementally variable transmission consisting of three quadriratio stages, with the first and second stages similar to FIG. 10, and the third stage similar to FIG. 12. Stages X^2−X and X^8−X^4 are identical and fitted with interactive hydraulic and spring disc clutches, with the third stage X^32−X^16 fitted with interactive twin hydraulically activated disc clutches to effect selection of their four ratio states. All functionally similar members maintain their previously assigned identification, with progressive decimal suffixing from stage to stage. The following components incorporate two or more functionally similar members or are designated new members: input shaft 1-14-5, with attached loop first gear element and spline; sun pinion 8-21, with attached slotted housing; annulus 6-21a, with attached slotted housing; stage output 10-11-5.1-5a, with attached loop last gear element and two splines; transmission and third stage output 10.2-11.2-5.2a, with attached loop last gear element and spline; loop first gear element 14.2-21.2a, with attached spline; backing plate 26, spring 27 and 28, outer clutch plates 29, clutch energizing piston 30, and interactive member 31. Other components are as previously identified. All interactive members 31 incorporate both an outer clutch disc and inner pressure plate, and are provided with segmented slots that permit axial movement in the slotted housings 21. Clutches b, d, f, and h, are self energizing by a plurality of springs 27, and become deenergized when hydraulic pistons 30 of their respective outer clutches a,c,e, and g are activated. Backing plate 26 contains the assembly, with outer spring 28 freeing outer clutch plates 29 when not activated. Inner clutches j and l function similarly, except they utilize hydraulic pistons 20 for activation, and therefore, are not self energizing. Bearings and fasteners, hydraulic feed passages, and oil galleries have not been identified. Table II lists the number of teeth on each gear element and records the first, second, and third-state ratio for each of the three stages as derived from equations (8),(9),(10), and (13),(14),(15).

TABLE II

| STAGE | GEAR ELEMENT | | | | | | | STATE RATIO | | |
|---|---|---|---|---|---|---|---|---|---|---|
| | 6 | 7 | 8 | 11 | 12 | 13 | 14 | 1st | 2nd | 3rd |
| X^2-X | 57 | 15 | 27 | 30 | 17 | 17 | 27 | 1.1111 | 1.0728 | 1.0357 |
| X^8-X^4 | 81 | 24 | 33 | 33 | 16 | 24 | 33 | 1.5000 | 1.3103 | 1.1447 |
| X^32-X^16 | 78 | 20 | 38 | 34 | 15 | 25 | 24 | 5.2954 | 3.0526 | 1.7347 |

With hydraulic clutches a,c,e,g,i, and k energized the reactive torque of the reverted gear train loop in the first and second stages, and that of the simple planitary train and mutated reverted gear train loop of the third stage will be directed to the transmission casing, with the incremental ratio of the transmission X^63, the product of their first state ratios (1.1111×1.50000×5.2954=8.8256). All gear elements in the transmission will be subject to the continuum loads, but only the reverted gear train loop members 11-12-13-14 of the first and second stages, and the common cage, cluster, planet, sun pinion, and loop last gear element of the third stage will be rotating. With each interactive clutch binary selectable, they may be selected in agreement with the stepping logic of the transmission of TABLE I. To step from incremental ratio X^63 to X^62, the reactive torque on sun pinion 8 is transferred from the casing to the input shaft by de-energizing hydraulic clutch a, permitting the springs to close clutch b. This process of incrementally decreasing the reactive torque on the transmission casing will continue with the sequential selection of the six binary clutches until all reactive torque is eliminated, with the transmission ending up as a solid coupling between the input and output member with no relative rotation of the gear elements. However, the gear elements remain in continuum since they are still subject to torque loads.

Figure 19:
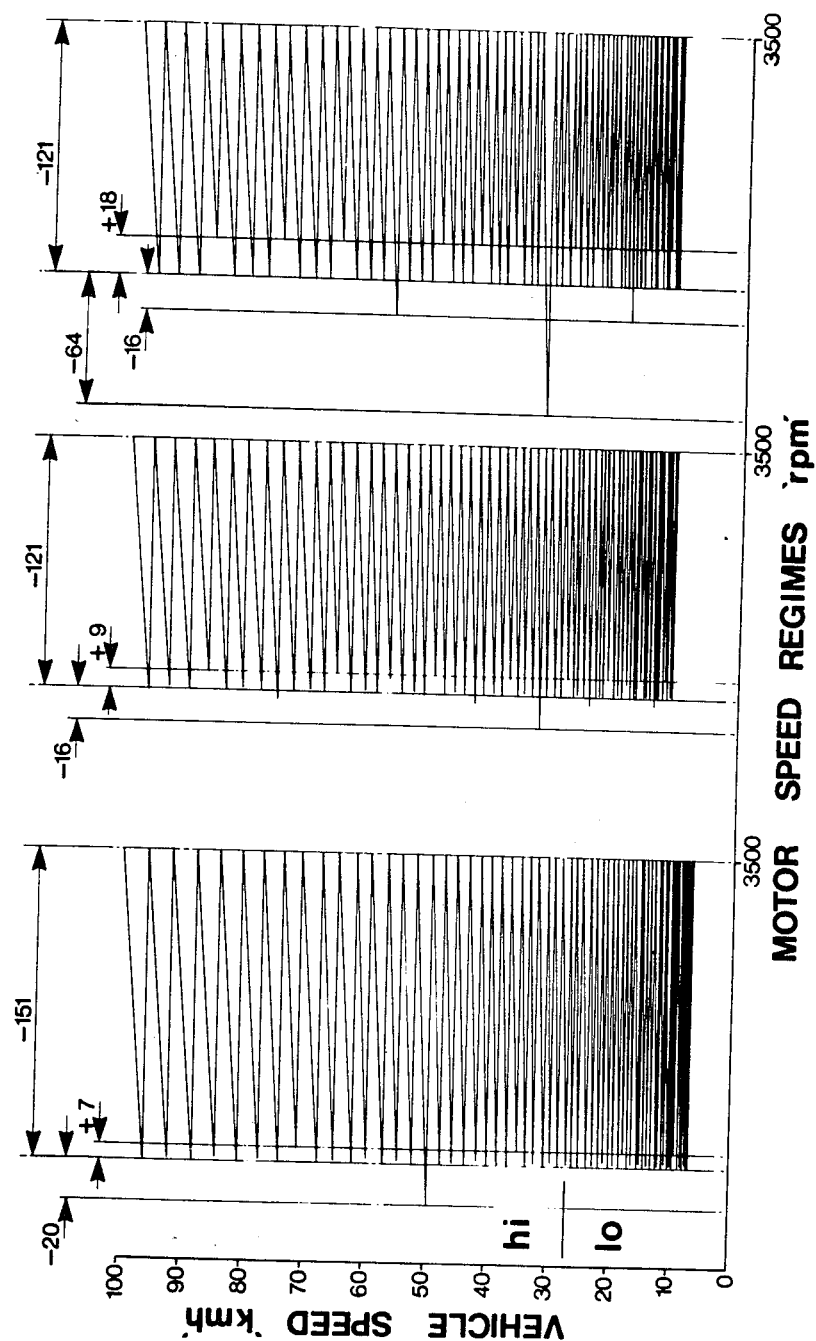
FIG. 19, is a graph showing the calculated variation in motor speed of the transmission of FIGS. 18, 20, and 22.

(xviii) Description of FIG. 19

Graph A, of FIG. 19 shows the expected change in motor speed with the transmission operating in a regime of 3500 rpm under the same assumptions as those made in the discussion of the ideal transmission of FIG. 3. A comparison of the two graphs shows a varing change in motor speed in this case as stepping takes place, vis-a-vis a constant change in motor speed in the previous case. This is the consequence of not maintaining a constant basic stage ratio X in all stages, because of the necessity to select an integer number of teeth on the gear elements rather than the fractional requirement of the ideal transmission. A more judicial selection of the gear elements could perhaps approximate more closely the ideal transmission of FIG. 3.

Figure 20:
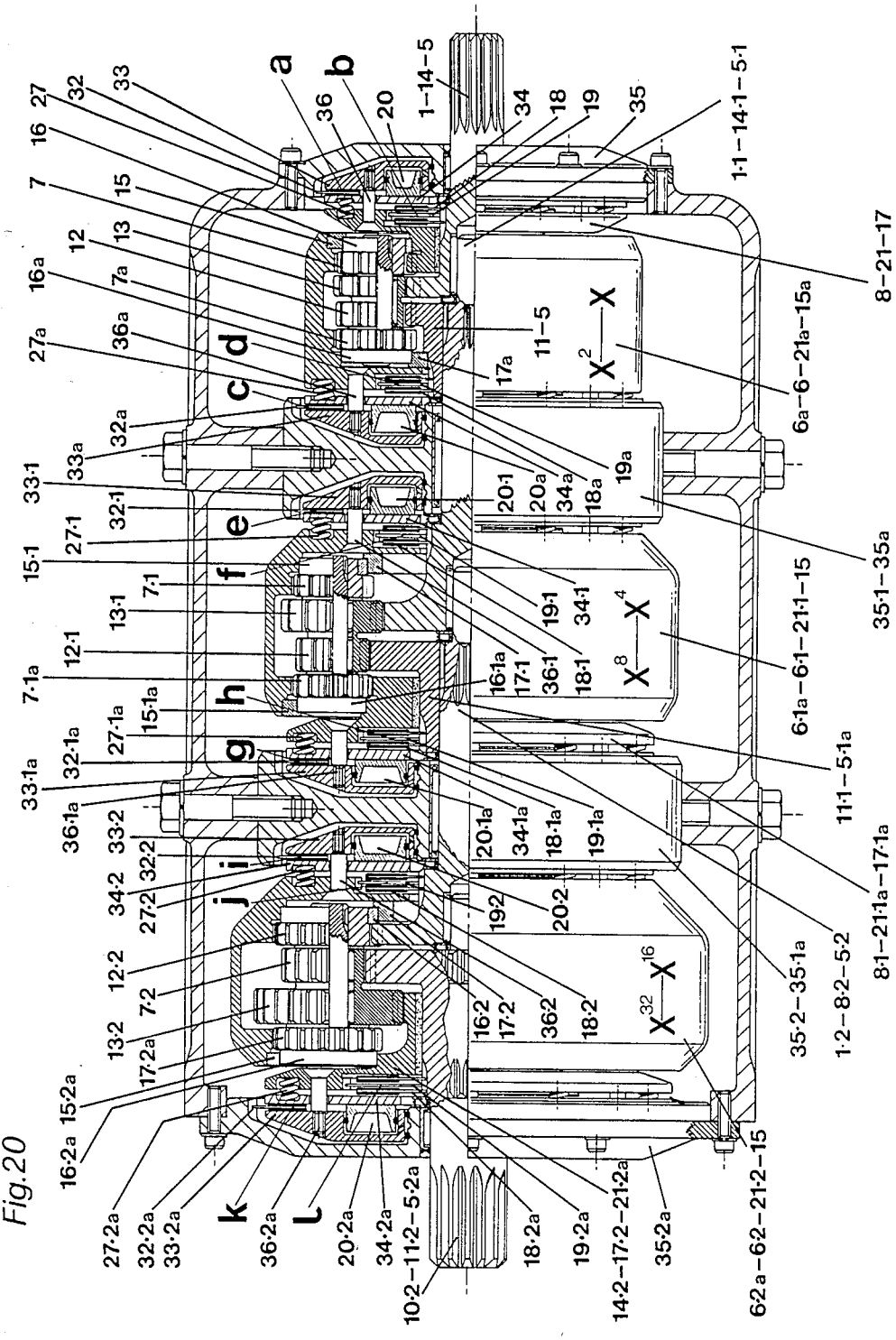
FIG. 20, shows a sixty-four increment transmission consisting of three cageless quadriratio stages, with the first and second stages $X^2-X$ and $X^8-X^4$ respectively similar to FIG. 11 CASE I and II, with the third stage $X^32-X^16$ similar to FIG. 13, and with all stages incorporating interactive spring and hydraulic disc clutches to effect selection of their four ratio states.

(xix) Description of FIG. 20

FIG. 20, is a sectioned assembly drawing of a binary logic incrementally variable transmission consisting of three quadriratio stages, with the first and second stages respectively defined by FIG. 11, CASE I and II, and with the third stage defined by FIG. 13. All stages are fitted with interactive spring and hydraulic clutches to effect the selection of their four state ratios. Again, all functionally similar members maintain their previously assigned identification, with progressive decimal suffixing from stage to stage. Again, the following components incorporate two or more of the functionally similar members as previously identified, or are designated new components: sun pinion 8-21-17 with splined housing and inner roller race; last gear element 11-5, with coupling spline; double annulus 6a-6-21a-15a, with splined housing and outer roller race; stage input shaft 1.1-14.1-5.1, with loop first gear element and coupling spline; stage input shaft 1.2-8.2-5.2, with sun pinion and coupling spline; loop first gear element 14.2-17.2a21.2a, with inner roller race and splined housing; sun pinion 8.1-21.1a17.1a, with splined housing and inner roller race; outer clutch disc 32; clutch and piston backing plate 33; interactive pressure plate 34; holdthru bolt 36; casing coupling spline 35, 35.1-35a, 35.2-35.1a, 35.2. All other components are as previously identified. Interactive pressure plates 34 interface with both internal and external disc clutches, and are provided with thru holes that permit axial movement on the hold-thru bolts. Outer clutches a,c,e,g,i, and k are self energized by a plurality of springs 27, and become de-energized with the hydraulic activation of their respective inner clutches b,d,f,h,j, and l. Table III, lists the number of teeth on each gear element and records the first, second, and third-state ratio for each of the three stages as derived from equations (8),(9),(10),(11),(12),(13), (14), and (15).

TABLE-III

| STAGE | GEAR ELEMENT | | | | | | | STATE RATIO | | |
|---|---|---|---|---|---|---|---|---|---|---|
| | 6 | 7 | 8 | 11 | 12 | 13 | 14 | 1st | 2nd | 3rd |
| X^ 2-X | 42 | 11 | 20 | 20 | 11 | 11 | 18 | 1.1111 | 1.0727 | 1.0358 |
| X^ 8-X^ 4 | 66 | 13 | 40 | 41 | 12 | 12 | 27 | 1.5185 | 1.3229 | 1.1479 |
| X^ 32-X 16 | 66 | 17 | 32 | 36 | 16 | 25 | 24 | 5.3416 | 3.0625 | 1.7442 |
| Reverse | 66 | 17 | 32 | 19 | 30 | 25 | 24 | −5.9375 | N/A | −1.9387 |

With the outer clutches all self-energizing, the natural state of the transmission will be the incremental ratio X 63, which again will be the product of the first-state ratios of the three stages (1.1111×1.5185×5.3416=9.0124). With each interactive clutch being binary selectable, they may be selected in agreement with the stepping logic of Table I, as in the discussion of FIG. 18 with the same end result. Graph B of FIG. 19 shows the actual change in motor speed that would be expected if this transmission was operating in a speed regime of 3500 rpm, again with the same assumptions as in the discussion of FIG. 3. The pros and cons of the structures shown in the transmissions of FIGS. 18 and 20, will depend on the usage and is too obscure to consider here. However, an appreciation of reactive torque build up from stage to stage, would be prudent.

Figure 21:
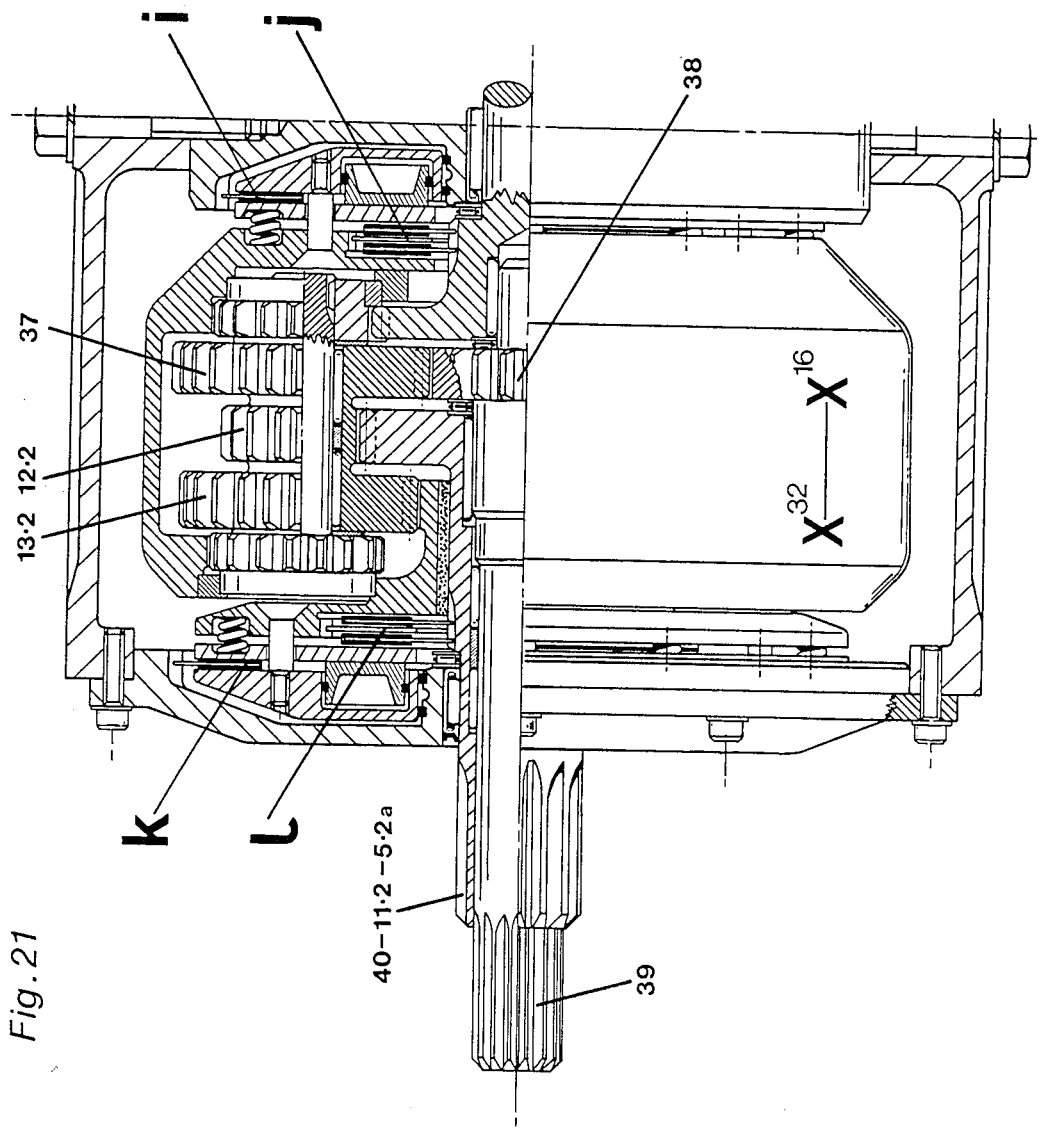
FIG. 21, shows the quadriratio third stage mechanism of FIG. 20 fitted with a selectable reverse output shaft.

(xx) Description of FIG. 21

FIG. 21, shows the third stage mechanism of FIG. 20, with a reverse gear arrangement. The following components have been added for this purpose: three gear element cluster incorporating gear elements 13.2, 12.2, and 37; Reverse output shaft 39 with attached gear element 38; forward output shaft 40-11.2-5.2a, with attached last gear element and coupling spline. The coaxially mounted forward output shaft is similar to the output shaft of FIG. 20 and therefore requires no further explanation. Equations (13) and (15), may be used to express the reverse output of this mechanism, if the reverse gear elements 38 and 37 are substituted in the equations for the gear elements 11 and 12 (see Table III):

$$r_{1r} = \frac{1 + \frac{66}{32}}{1 - \frac{24}{25} \times \frac{30}{19}} = -5.9375 \quad \text{Equation (13)}$$

$$r_{3r} = \frac{1}{1 - \frac{24}{25} \times \frac{30}{19}} = -1.9387 \quad \text{Equation (15)}$$

This indicates that there are two reverse ratios in the third stage that will permit reverse output of the transmission. Either of these reverse ratios can be made to step in the same manner as the forward ratios, but only in the above ratios of the third stage. Effectively, the transmission has an incrementally variable HI and LO reverse range.

Figure 22:
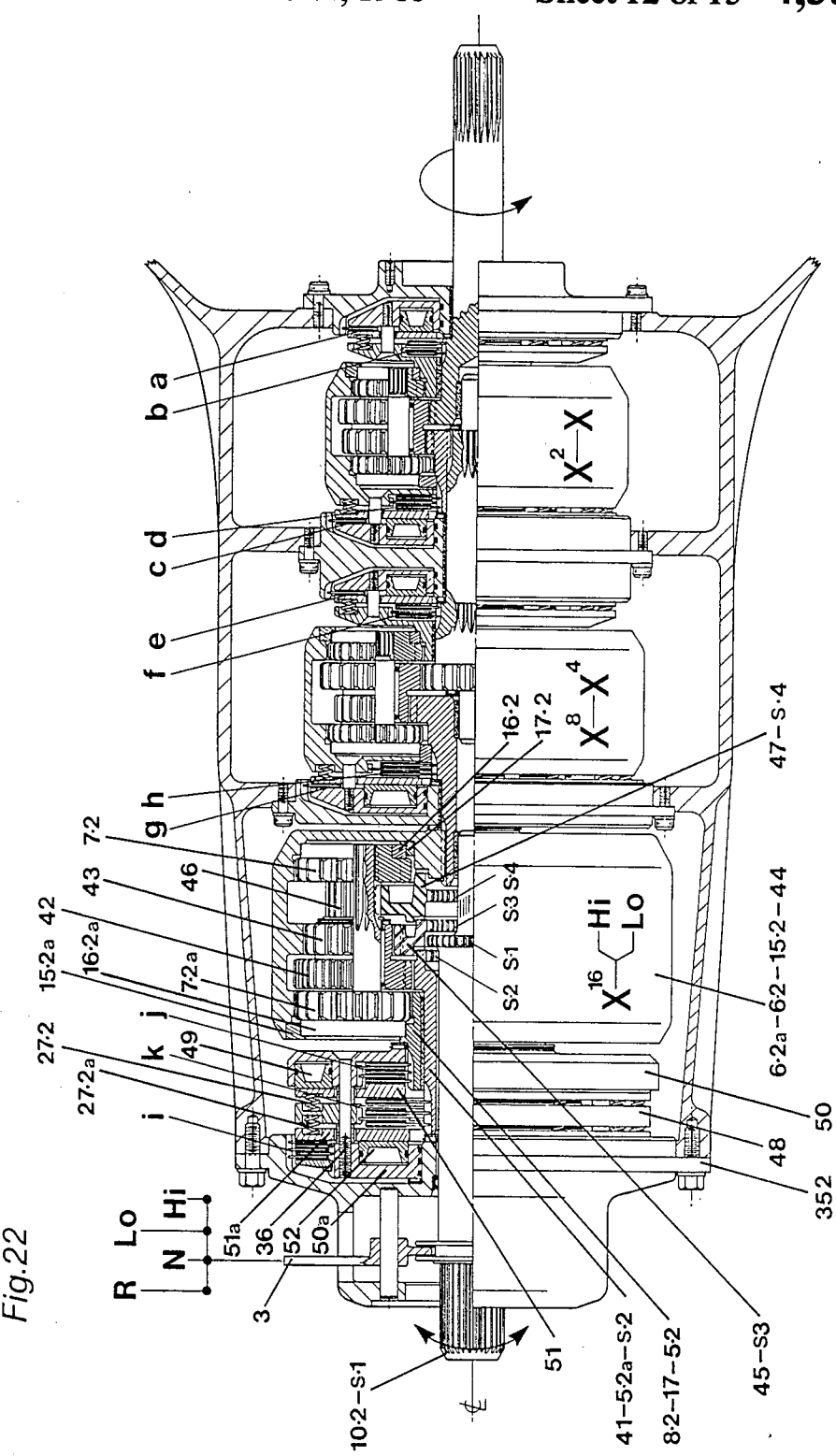
FIG. 22, shows a selectable HI-LO-Reverse sixty-four increment transmission consisting of three cageless quadriratio stages, with the first and second stages X^2—X and X^8—X^4 similar to FIG. 11, with the third stage X^16—HI-LO similar to FIG. 13a and incorporating a third annulus and multiplex disc clutches to effect selection of the HI-LO-Reverse range of the transmission.

(xxi) Description of FIG. 22

FIG. 22, is a sectioned assembly drawing of a HI-LO Reverse binary logic incrementally variable transmission consisting of three quadriratio stage mechanisms, with both stages X^2−X and X^8−X^4, similar to FIG. 11 CASE I, with the third stage X 16-Hi-Lo incorporating features similar to FIG. 13a, but with a third annulus and multiplex disc clutches to effect selection of the Hi-Lo-Reverse range of the transmission. The structure of the first and second stages are similar to the first stage of the transmission of FIG. 20, with members identified accordingly. Third stage members maintain previously assigned identification or are identified as follows: triple element annulus 6.2a-6.2-44-15.2, with attached center annulus and outer roller race; output shaft 10.2-2.2-S.1, with attached external spline; reverse output gear element 41-5.2a-S.2, with attached coupler spline and internal spline; cluster 42–43; center annulus 44; Lo-output gear element 45-S.3, with attached internal spline; Hi-spool gear element 46; Hi-output gear element 47, with attached internal spline; splined center piece 48; clutch j deactivating piston 49; assembly housing 50; interactive pressure plate 51; clutch i deactivating piston 52. Clutches j and i are self-energized by a plurality of springs 27.2 and 27.2a, and are de-energized by activating pistons 49 and 52 through the interaction of the pressure plates 51 and 51a. With either activating piston 49 or 52 activated clutch k becomes energized. Table IV, lists the number of teeth on each gear element and records the first, second, and third-state ratios for each of the first two stages as derived from equations (8),(9), and (10).

TABLE-IV

| STAGE | GEAR ELEMENT | | | | | | | STAGE RATIO | | |
|---|---|---|---|---|---|---|---|---|---|---|
| | 6 | 7 | 8 | 11 | 12 | 13 | 14 | 1st | 2nd | 3rd |
| X^2-X | 64 | 17 | 30 | 47 | 44 | 47 | 44 | 1.1410 | 1.0919 | 1.0450 |
| X^8-X^4 | 78 | 24 | 30 | 39 | 30 | 39 | 30 | 1.6900 | 1.4182 | 1.1917 |

With the number of teeth on the gear elements of the third stage, gear 6=62, gear 7=19, gear 8=24, gear 41=43, gear 42=36, gear 43=17, gear 44=64 gear 45=30, gear 46=15, and gear 47=60, the HI-LO-Reverse ratios will be as follows:

$$X \wedge 16 - R = \frac{1 + \frac{24}{62}}{1 - \frac{24}{62} \times \frac{64}{17} \times \frac{36}{43}} = -6.3030$$

$$LO = \frac{1 + \frac{43}{36} \times \frac{17}{64}}{1 - \frac{43}{36} \times \frac{17}{30}} = 4.0764$$

$$X \wedge 16 - LO = \frac{1 + \frac{24}{62}}{-\frac{24}{62} \times \frac{64}{30}} = 7.9630$$

$$X \wedge 16 - HI = \frac{1 + \frac{24}{62}}{1 - \frac{24}{19} \times \frac{15}{60}} = 2.0273$$

Where: the numbers in the equations are the number of teeth on the gear elements.

With the outer clutches a,c,e, and g energized, the first and second stages would be in their first-state ratios with the incremental ratio of the transmission dependent on the selection of the third stage multiplex disc clutches and the position of the shift fork. With both clutch i and j energized and the shift fork in the Reverse position the incremmental ratio of the transmission would be the product of their respective state ratios (1.1410×1.6900× −6.3027= −12.1534). Incremental stepping of the transmission in reverse will decrease this ratio to −6.3027 as the first and second stages both step to unity. Under the same conditions and with the shift fork in the LO position, the ratio would be 1.1410×1.6900×7.9633=15.3556, and stepping of the transmission would include closure of clutch k with the finally sequenced incremental ratio LO=4.0764 as indicated in the calculations. The HI range of the transmission requires that clutch k be energized and clutch j be deenergized with the shift fork in the HI position. Again the incremental ratio of the transmission would be the product of the relative state ratios (1.1410×1.6900×2.0273=3.9092). Sequential stepping of the transmission would end in ratio HI=1, when both clutches k and j have been energized with clutch i de-energized by activating piston 52, resulting in all three stages having a state ratio of unity. In an ideal transmission of this structure, the final incremental ratio LO would be the starting incremental ratio of the HI range. The difference in this case, again being the necessity to select an integer numbers of teeth on the gear elements rather than the fractional requirements of the ideal transmission. Graph C of FIG. 19 shows the expected change in motor speed of this transmission under the same conditions as previously discussed.

Figure 23:
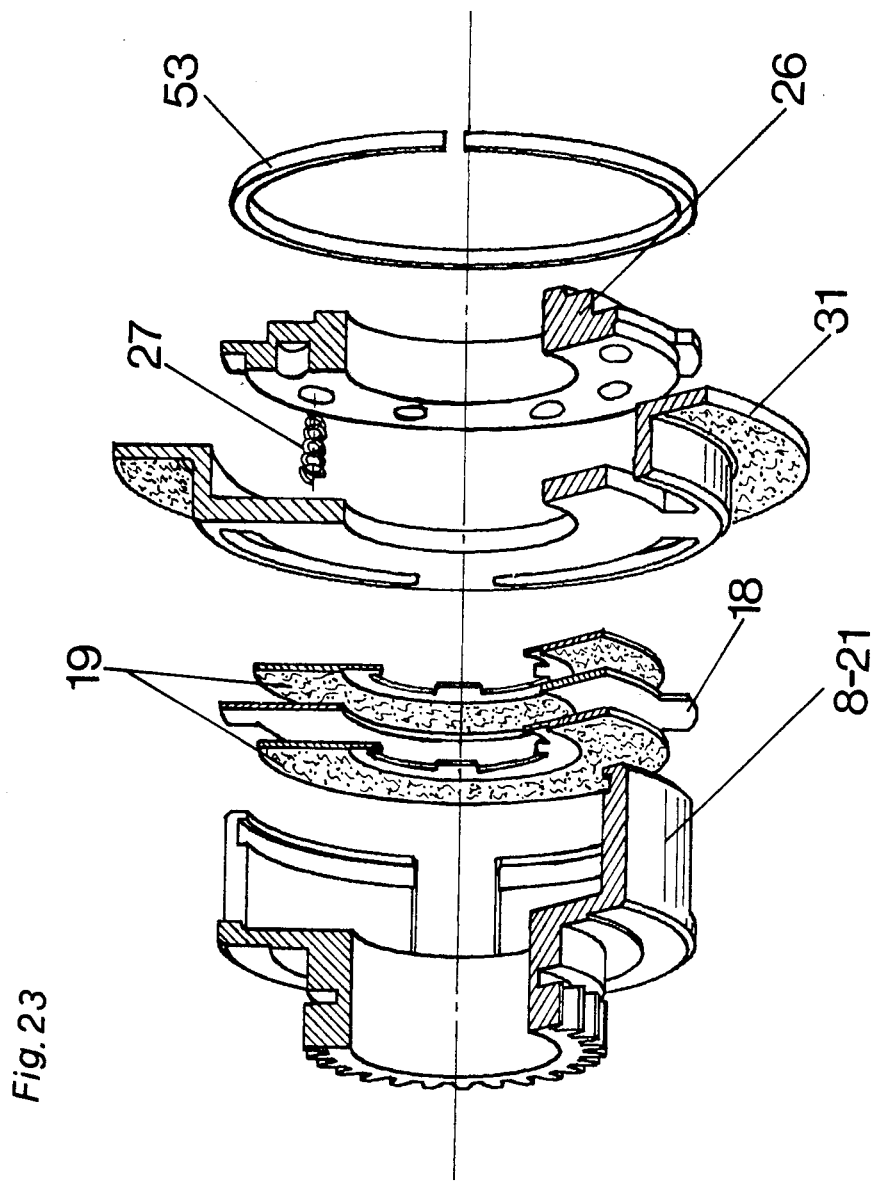
FIG. 23, shows the structure and components of a clutch pack from the interactive spring and hydraulic disc clutches of FIG. 18.

(xxii) Description of FIG. 23

FIG. 23, is a quarter section exploded view showing the structure of the clutch pack of the interactive spring and hydraulic clutches of FIG. 18. The components maintain their previously assigned identity, with the addition of the cirscip 53. Although the clutch pack is shown affixed to the sun pinion, the structure of the clutch pack affixed to the annulus is identical. The clutch packs of FIG. 20, and that of the third stage of FIG. 22, have somewhat the same structure except that a thru-bolt is used to hold the structures together rather than the splined housings.

OPERATION OF EMBODIMENTS

The disclosed structures of the interactive clutch combinations in the transmissions of FIGS. 18, 20, 21, and 22, together with the overrunning and hydraulic clutch combination of FIG. 16, and the dog teeth coupling arrangement of FIGS. 10, 12, and 12a, provides a number of different methods to effect the decrement of reactive torque. They are all interchangeable and again their selection will depend mainly on the usage of the transmission. The transmission of FIG. 20 is perhaps more suitable for machine drives with small prime movers, where the object is to provide a large number of spindle speeds rather than a constant power transmission system as in vehicular applications. For the latter case the transmission of FIG. 18 would perhaps be more satisfactory, since the reactive torque on the third stage clutches would be high, and the required generating forces to de-energize the spring section as well as energize the hydraulic section would be a less practical solution than the twin interactive hydraulic clutch arrangement. The multiplex spring and hydraulic clutch arrangement of FIG. 22 would most certainly be a less desirable arrangement than the dog teeth coupling system of FIG. 12a, or the interactive twin hydraulic clutch packs of FIG. 18, if the transmission was to be used for heavy vehicular use. The former would require manual selection of all four state ratios of the third stage rather than only the two as shown. The interactive spring and hydraulic clutch arrangement of the first and second stages of FIGS. 18, 20, and 22, would perhaps be a practical solution for these transmissions irregardless of the application, since the required torque capacity of the clutches in these stages are a small fraction of the input torque to the transmission. The difference in the first and second stage clutch arrangement of FIGS. 18, and 20, is such that hydraulic failure would return the ratio states of FIG. 18 to the fourth-state ratios, whereas FIG. 20 would return to the first-state ratio. This could have some vehicular significance.

The transmissions shown in FIGS. 18, 20, 22, have quadriratio stages, and overall ranges of approximately 9 and 16. Transmissions with similar ranges having two or indeed only one quadriratio stage are feasible, but the magnitude in motor speed change will be much greater, and may be derived from equation (2). An evenly spaced four speed transmission with an overall range of 4 would require a motor speed change of 59%, and could be structured from any of the stages shown in FIGS. 10,11,12,12a,13,13a, or FIG. 16 if prime mover braking is not required, and be more compact than the present state of-the-art transmissions. Structures FIGS. 12,12a,13,13a could including reverse output shafts.

The closure frequency of the clutches in any of the transmissions shown is indicated in Table I. Interactive clutch a-b alternates between a and b with each sequential step, clutch c-d alternates between c and d with each sequential second step, with clutch e-f alternating between e and f with each sequential fourth step, ect., halving the closure frequency with each sucessive clutch. Compairing frequency and magnitude of reactive torque on each clutch, shows that as one increases the other decreases, with the high frequency clutches subject to small torques.

If we assume that 0.5 second is the required time constant for all sequential steps, then the model sixty-four increment transmissions will require 32 seconds to change from 9/1 to 1. While this could be an acceptable condition for many applications, it would be of little use in most vehicular applications. However, why only one step? If it is desired to keep motor speed relatively constant, vehicle acceleration could be interpreted to signal the required size of step to keep motor speed withihn limits. A fully automatic transmission with a large number of incremental steps will certainly require a computer control system. Since the actual control system does not form an essential part of the present invention, no discussion of that control system will be given now.

In the discussion of FIGS. 4,5,6,7,8, the second-state ratio of FIGS. 4,5,6,7, resulted, with the coupling of the reactive members to the input shaft, and that of FIG. 8, with the reactive member coupled to the output shaft. The converse would be as effective, since the biratio stages become solid couplings in either case.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What I claim is:

1. A binary logic incrementally variable transmission including a casing, and comprising either a sequence of biratio stages, a sequence of quadriratio stages, or a combined sequence of biratio and quadriratio stages: with a biratio stage having an input component, an output component, and a reactive component; said input component, said output component, and said reactive component being so interrelated that when said reactive component is coupled to said casing by an incorporated binary coupling means a 1st ratio-state greater than unity will result, and when said reactive component is coupled to said input component by said binary coupling means a 2nd ratio-state of unity will result; with said ratio-states defined as a ratio of input-/output rotational speed: with a quadriratio stage having an input component, an output component, and two reactive components; with said input component, said output component, and said two reactive components, so interrelated that when said two reactive components are coupled to said casing by a first and a second binary coupling means incorporated respectively on each, a 1st ratio-state greater than unity will result; and when a reactive component of said two reactive components with a first binary coupling means incorporated is coupled to said input component with said second reactive component coupled to said casing a 2nd ratio-state equal to two-thirds the root of said 1st ratio-state will result; and when said second reactive component of said two reactive components with said second binary coupling means incorporated is coupled to said output component with said first reactive component coupled to said casing a 3rd ratio-state equal to one-third the root of said 1st ratio-state will result; and when both said reactive components are coupled respectively to said input and output components a 4th ratio-state of unity will result; with said ratio-states defined as a ratio of input/output rotational speed: when said transmission comprises said sequence of biratio stages, said 1st ratio-states of said sequence of stages are expressed by the equation;

$$r_{1,2} = [X^{2^n-1}]_0^1;$$

as with a first biratio stage where n=1 a 1st ratio-state is of the order of X; as with a second biratio stage where n=2 a 1st ratio-state is of the order of $X^2$, in geometric progression X, $X^2$, $X^4$, $X^8$, $X^16$, $X^32$, etc.; so that when said sequence of biratio stages are permuted in all combinations of product a ratio-state between said input component of a first stage and said output component of a last stage in said transmission will be of the order of a geometric progression $X^0$, $X^1$, $X^2$, $X^3$, $X^4$, etc., with a value of X in said geometric progression defined by R a maximum combination of permuted product of n stages as in 1,2,3,... n−1,n, of said transmission, and expressed by the equation;

$$X = R\left[\frac{1}{2^n - 1}\right];$$

with a total number of ratio-states T between said input component of said first stage and said output component of said last stage in said transmission expressed by the equation;

$$T = 2^n;$$

when said transmission comprises said sequence of quadriratio stages, said 1st, 2nd, 3rd and 4th ratio-states of a quadriratio stage are a permuted product of equivalent adjacent pairs of biratio stages of said geometric progression X, $X^2$, $X^4$, $X^8$, $X^16$, etc., and expressed by the equation;

$$r_{1,2,3,4} = [X^{2^n-1}]_0^1 * [X^{2^n}]_0^1;$$

as with a first quadriratio stage where said equivalent adjacent pair of biratio stages are n=1 and n+1=2 said four ratio-states are respectively of the order of $X^3$, $X^2$, X and unity; as with a second quadriratio stage where said equivalent adjacent pair of biratio stages are n=3 and n+1=4 said four ratio-states are respectively of the order of $X^12$, $X^8$, $X^4$, and unity; as with a third quadriratio stage where said equivalent adjacent pair of biratio stages are n=5 and n+1=6 said four ratio-states are respectively of the order of $X^48$, $X^32$, $X^16$ and unity; etc.; with said 1st ratio-states of said sequence of quadriratio stages being of the order of a geometric progression $X^3$, $X^{12}$, $X^{48}$, $X^{192}$, etc.; so that when said sequence of stages are permuted in all combinations of product a ratio-state between said input component of a first stage and said output component of a last stage in said transmission will be of the order of said geometric progression $X^0$, $X^1$, $X^2$, $X^3$, $X^4$, etc.: and, when said transmission comprises said combined sequence of biratio and quadriratio stages, said 1st, 2nd, 3rd and 4th ratio-states of a quadriratio stage are a permuted product of any equivalent adjacent pair of biratio stages of said geometric progression X, $X^2$, $X^4$, $X^8$, $X^16$, ect.; as when n=2 and n+1=3, said four ratio-states are respectively of the order of $X^6$, $X^4$, $X^2$ and unity; as when n=4 and n+1=5, said four ratio-states are respectively of the order of $X^24$, $X^16$, $X^8$ and unity; so that when said sequence of stages are permuted in all combinations of product a ratio-state between said input component of a first stage and said output component of a last stage in said transmission will be of the order of said geometric progression $X^0$, $X^1$, $X^2$, $X^3$, $X^4$, etc.

2. A biratio stage for a binary logic incrementally variable transmission of claim 1 comprising of a planetary gear train with an annulus thereof being said input component, said output component a carrier and planets thereof, said reactive component a sun pinion thereof and incorporating said binary coupling means: said interrelationship is that when said sun pinion is coupled to said transmission casing said 1st ratio-state greater than unity is provided, and when said sun pinion is coupled to said input component said 2nd ratio-state of unity is provided.

3. A biratio stage for a binary logic incrementally variable transmission of claim 1 comprising of a planetary gear train with a sun pinion thereof being said input component, said output component a carrier and planets thereof, said reactive component an annulus thereof and incorporating said binary coupling means: said interrelationship is that when said annulus is coupled to said transmission casing said 1st ratio-state greater than unity is provided, and when said annulus is coupled to said input component said 2nd ratio-state of unity is provided.

4. A biratio stage for a binary logic incrementally variable transmission of claim 1 comprising of a compound planetary gear train with a free carrier and cluster gears, said input component a sun pinion thereof, said output component a common gear element congruent with said cluster gears thereof and coaxially mounted with said sun pinion, said reactive component an annulus thereof and incorporating said binary coupling means: said interrelationship is that when said annulus is coupled to said transmission casing said 1st ratio-state greater than unity is provided, and when said annulus is coupled to said input component said 2nd ratio-state of unity is provided.

5. A biratio stage for the binary logic incrementally variable transmission of claim 1 comprising a cageless compound planetary gear train with a plurality of triple cluster gear elements; with first and last elements of said triple clusters meshing with a double annulus, and said first gear element of said triple clusters meshing with said input component a common sun pinion thereof, with the center gear element of said triple clusters meshing with said output component a common gear element thereof coaxially mounted with said common sun pinion; with roller elements equal to a pitch circle diameter of said first and last elements affixed outboard on said triple clusters, congruent to outer races with end-thrust flanges and diameters equal to the pitch circle diameter of said double annulus, and congruent to inner races with end-thrust flanges and diameters equal to the pitch circle diameter of said sun pinion, thereby providing axial and lateral stability to all said gear elements; said reactive component being said double annulus thereof and incorporating said binary coupling means: said interrelationship is that when said double annulus is coupled to said transmission casing said 1st ratio-state greater than unity is provided, and when said double annulus is coupled to said input component said 2nd ratio-state of unity is provided.

6. A biratio stage for the binary logic incrementally variable transmission of claim 1 comprising a plurality of reverted gear train loops and a carrier, said input component being a first common gear element of said loops, said output component being a last common gear element of said loops, said reactive component being said carrier and incorporating said binary coupling means: said interrelationship is that when said carrier is coupled to said transmission casing said 1st ratio-state greater than unity is provided, and when said carrier is coupled to said input component said 2nd ratio-state of unity is provided.

7. A biratio stage for the binary logic incrementally variable transmission of claim 1 comprising a plurality of mutated reverted gear train loops and a carrier, said output component being a last common gear element of said loops, said input component being said carrier, said reactive component being a first common gear element of said loops and incorporating said binary coupling means: said interrelationship is that when said first common gear element is coupled to said transmission casing said 1st ratio-state greater than unity is provided, and when said first common gear element is coupled to said input component said 2nd ratio-state of unity is provided.

8. A quadriratio stage for a binary logic incrementally variable transmission of claim 1 comprising a planetary gear train with a plurality of planet gear elements and a carrier, with cluster gear elements of a same number of reverted gear train loops incorporated into said carrier as said plurality of planet gear elements: said input component being a first common gear element of said loops, said output component being a last common gear element of said loops, a reactive component of said two reactive components being a sun pinion of said planetary gear train and incorporating said first binary coupling means, a second of said two reactive components being an annulus of said planetary gear train and incorporating said second binary coupling means: said interrelationship is that, with said sun pinion and said annulus of said planetary gear train both coupled to said transmission casing said 1st ratio-state is provided; with said annulus coupled to said transmission casing and said sun pinion coupled to said input component said 2nd ratio-state is provided; with said sun pinion coupled to said transmission casing and said annulus coupled to said output component said 3rd ratio-state is provided; and with said sun pinion coupled to said input component and said annulus coupled to said output component said 4th ratio-state of unity is provided.

9. A quadriratio stage for the binary logic incrementally variable transmission of claim 1 comprising a planetary gear train with a double annulus and a plurality of double spool planet gear elements, with cluster gear elements of a same number of reverted gear train loops incorporated free to rotate on said plurality of double spools between said planet gear elements; with roller elements equal to the diameter of said planet gear elements affixed outboard on said plurality of spools congruent with outer races with end-thrust flanges and diameters equal to a pitch diameter of said double annulus, and congruent with inner races with end-thrust flanges and diameters equal to a pitch diameter of said sun pinion, thereby providing axial and lateral stability to all said gear elements: said input component being a first common gear element of said loops, said output component being a last common gear element of said loops, a reactive component of said two reactive components being a sun pinion of said planetary gear train and incorporating said first binary coupling means, a second of said two reactive components being said double annulus of said planetary gear train and incorporating said second binary coupling means: said interrelationship being that, with said sun pinion and said double annulus of said planetary gear train both coupled to said transmission casing said 1st ratio-state is provided; with said double annulus coupled to said transmission casing and said sun pinion coupled to said input component said 2nd ratio-state is provided; with said sun pinion coupled to said transmission casing and said annulus coupled to said output component said 3rd ratio-state is provided; and with said sun pinion coupled to said input component and said double annulus coupled to said output component said 4th ratio-state of unity is provided.

10. A quadriratio stage as claimed in claim 8 where said annulus is coupled to said input component and said sun pinion is coupled to said output component.

11. A quadriratio stage as claimed in claim 9 where said double annulus is coupled to said input component and said sun pinion is coupled to said output component.

12. A quadriratio stage for the binary logic incrementally variable transmission of claim 1 comprising a planetary gear train with a plurality of planet gear elements and a carrier, with cluster gear elements of a same number of mutated reverted gear train loops incorporated into said carrier as said plurality of planet gear elements: said output component being a first common gear element of said mutated loops, said input component being a sun pinion of said planetary gear train, a first of said two reactive components being an annulus of said planetary gear train and incorporating a said first binary coupling means: a second of said two reactive components being a last common gear element of said mutated loops and incorporating a said second binary coupling means: said interrelationship is that, with said last common gear element of said mutated loops and said annulus of said planetary gear train both coupled to said transmission casing said 1st ratio-state is provided; with said last common gear element coupled to said transmission casing and said annulus coupled to said input component said 2nd ratio-state is provided; with said annulus coupled to said transmission casing and said last common gear element coupled to said output component said 3rd ratio-state is provided; and with said annulus coupled to said input component and said last common gear element coupled to said output component said 4th ratio-state of unity is provided.

13. A quadriratio stage for the binary logic incrementally variable transmission of claim 1 comprising a planetary gear train with a double annulus and a plurality of double spool planet gear elements, with cluster gear elements of a same number of mutated reverted gear train loops incorporated on said double spools and free to rotate between said planet gear elements as said plurality of double spools; with roller elements equal to the diameter of said planet gear elements affixed outboard on said plurality of spools congruent with outer races with end-thrust flanges and diameters equal to a pitch diameter of said double annulus, and congruent with inner races with end-thrust flanges and diameters equal to a pitch diameter of said sun pinion, thereby providing axial and lateral stability to all said gear elements: said output component being a first common gear element of said mutated loops, said input component being a sun pinion of said planetary gear train, a first of said two reactive components is said double annulus of said planetary gear train and incorporating said first binary coupling means: a second of said two reactive component being a last common gear element of said mutated loops and incorporating said second binary coupling means: said interrelationship is that, with said last common gear element of said mutated loops and said double annulus of said planetary gear train both coupled to said transmission casing said 1st ratio-state is provided; with said last common gear element coupled to said transmission casing and said double annulus coupled to said input component said 2nd ratio-state is provided; with said double annulus coupled to said transmission casing and said last common gear element coupled to said output component said 3rd ratio-state is provided; and with said double annulus coupled to said input component and said last common gear element coupled to said output component said 4th ratio-state of unity is provided.

14. A quadriratio stage as claimed in claim 12 where said input component is said annulus and a first of said two reactive components is said sun pinion with said first binary coupling means incorporated.

15. A quadriratio stage as claimed in claim 13 where said input component is said double annulus and a first of said two reactive components is said sun pinion with said first binary coupling means incorporated.

16. A said binary coupling means for the transmissions as claimed in claim 1 comprising an assembly with an external overrunning clutch and an internal hydraulically activated clutch pack; said assembly having an open ended slotted cylindrical extension with an enclosing end cap held by a circlip, with said cap incorporating an inner race of said overrunning clutch and a piston and cylinder of said internal hydraulically activated clutch pack, with an outer race of said overrunning clutch fixed to said transmission casing: said internal clutch pack consists of a plurality of internal clutch plates and a pressure plate keyed to said slotted extension, a plurality of internal clutch discs keyed to said input component, and said end cap with said piston abutting said internal pressure plate so that when said internal clutch pack is hydraulically energized said assembly is held fixed to said input component: therefore, when said internal clutch pack is deenergized a reactive torque on said assembly is transferred to said transmission casing, and when said internal clutch pack is energized said reactive torque is transferred to said input component.

17. A said second binary coupling means as claimed in claim 16 except that said internal clutch discs are keyed to said output component, and said reactive torque on said assembly is transferred to said output component.

18. A said binary coupling means for the transmissions as claimed in claim 1 comprising an assembly with an external hydraulically activated clutch pack, an internal spring activated clutch pack, and incorporating an interactive member with an external outer clutch disc section and an internal pressure plate section, said sections radially separated and keyed to an open ended slotted cylindrical extension of said assembly: said external clutch pack consists of said outer clutch disc section, a plurality of external clutch discs keyed to said slotted cylindrical extension, a plurality of external clutch plates and an external pressure plate keyed to slots incorporated in said transmission casing, said external hydraulically activated piston abutting said pressure plate, with said cylinder arranged so that when said external clutch pack is energized said asembly is held fixed to said transmission casing: said internal spring activated clutch pack consists of a plurality of internal clutch plates keyed to said slotted extension, a plurality of internal clutch discs keyed to said input component, said springs incorporated in an end cap enclosing said cylindrical extension and held by a circlip, and with said springs abutting said internal pressure plate section so that said assembly is held fixed to said input component: therefore, with said external clutch pack de-energized said internal clutch pack transfers a reactive torque on said assembly to said input component, and when said external clutch pack is energized said internal clutch pack uncouples from said input component and said reactive torque is transferred to said transmission casing.

19. A said second binary coupling means as claimed in claim 18 except that said internal clutch discs are keyed to said output component, and said reactive torque on said assembly is transferred to said output component.

20. A said binary coupling means for the transmissions as claimed in claim 1 comprising an assembly with an external hydraulically activated clutch pack, an internal hydraulically activated clutch pack, and incorporating an interactive member with an external outer clutch disc section and an internal pressure plate section, said sections radially separated and keyed to an open ended slotted cylindrical extension of said assembly: said external clutch pack consists of said outer clutch disc section, a plurality of external clutch discs keyed to said slotted cylindrical extension, a plurality of external clutch plates and an external pressure plate keyed to slots incorporated in said transmission casing, said external hydraulically activated piston abutting said pressure plate, and with said cylinder arranged so that when said external clutch pack is hydraulically energized said asembly is held fixed to said transmission casing: said internal hydraulically activated clutch pack consists of a plurality of internal clutch plates keyed to said slotted extension, a plurality of internal clutch discs keyed to said input component, a piston with cylinder incorporated in an end cap enclosing said cylindrical extension and held by a circlip, with said piston abutting said internal pressure plate section so that when said internal clutch pack is hydraulically energized said assembly is held fixed to said input component: therefore, with said external clutch pack de-energized and said internal clutch pack energized a reactive torque on said assembly is transferred to said input component, and when said external clutch pack is energized and said internal clutch pack is de-energized said reactive torque is transferred to said transmission casing.

21. A said second binary coupling means as claimed in claim 20 except that said internal clutch discs are keyed to said output component, and said reactive torque on said assembly is transferred to said output component.

22. A quadriratio stage as claimed in claim 12 wherein said output component includes a hollow shaft concentrically mounted on a reverse output shaft with an affixed common driven gear element of a set of gear elements consisting of a same number of driver gear elements as said cluster gear elements and affixed to said clusters congruent to said common driven gear affixed to said reverse output shaft.

* * * * *